United States Patent
Hyde et al.

(10) Patent No.: US 11,814,083 B2
(45) Date of Patent: Nov. 14, 2023

(54) ASYNCHRONOUS PROCESSING FOR AUTONOMOUS VEHICLE COMPUTING SYSTEMS

(71) Applicant: UATC, LLC, San Francisco, CA (US)

(72) Inventors: Sean Hyde, Pittsburgh, PA (US); Jose Francisco Molinari, Cranberry Township, PA (US); Stephen Luke Thomas, Cheswick, PA (US)

(73) Assignee: UATC, LLC, Mountain View, CA (US)

( * ) Notice: Subject to any disclaimer, the term of this patent is extended or adjusted under 35 U.S.C. 154(b) by 277 days.

(21) Appl. No.: 16/893,630

(22) Filed: Jun. 5, 2020

(65) Prior Publication Data
US 2021/0300425 A1 Sep. 30, 2021

Related U.S. Application Data

(60) Provisional application No. 63/002,675, filed on Mar. 31, 2020.

(51) Int. Cl.
*B60W 60/00* (2020.01)
*G05D 1/00* (2006.01)
(Continued)

(52) U.S. Cl.
CPC ........ *B60W 60/0025* (2020.02); *B60W 50/04* (2013.01); *B60W 60/001* (2020.02);
(Continued)

(58) Field of Classification Search
CPC ........ B60W 60/0025; B60W 60/0015; B60W 60/0027; B60W 60/001; B60W 50/04;
(Continued)

(56) References Cited

U.S. PATENT DOCUMENTS 2,976,934 A 3/1961 Todee
4,741,163 A 5/1988 Hidaka et al.
(Continued)

FOREIGN PATENT DOCUMENTS

EP 2976934 A1 1/2016

OTHER PUBLICATIONS

International Search Report and Written Opinion on Patentability for Application No. PCT/US2021/019844, dated Jul. 12, 2021, 21 pages.
(Continued)

*Primary Examiner* — Hunter B Lonsberry
*Assistant Examiner* — Jay Khandpur
(74) *Attorney, Agent, or Firm* — Dority & Manning, P.A.

(57) ABSTRACT

Systems and methods are directed to an autonomy computing system for an autonomous vehicle. The autonomy computing system can include functional circuits associated with a first compute function of the autonomous vehicle. Each of the functional circuits can be configured to obtain sensor data that describes one or more aspects of an environment external to the autonomous vehicle at a current time. Each of the functional circuits can be configured to generate, over a time period and based on the sensor data, a respective output according to the specified order. The autonomy computing system can include monitoring circuits configured to evaluate an output consistency of the respective outputs, and in response to detecting an output inconsistency between two or more of the respective outputs, generate data indicative of a detected anomaly associated with the first autonomous compute function.

20 Claims, 14 Drawing Sheets

(51) Int. Cl.
*B60W 50/04* (2006.01)
*G05B 13/02* (2006.01)
*G06N 3/063* (2023.01)
*G06N 3/08* (2023.01)
*G06N 3/045* (2023.01)

(52) U.S. Cl.
CPC .... *B60W 60/0015* (2020.02); *B60W 60/0027* (2020.02); *G05B 13/027* (2013.01); *G05D 1/0088* (2013.01); *G06N 3/045* (2023.01); *G06N 3/063* (2013.01); *G06N 3/08* (2013.01); *B60W 2554/00* (2020.02); *B60W 2555/00* (2020.02); *G05D 2201/0213* (2013.01)

(58) Field of Classification Search
CPC .......... B60W 2554/00; B60W 2555/00; G05B 13/027; G05D 1/0088; G05D 2201/0213; G06N 3/0454; G06N 3/063; G06N 3/08; G06N 3/045
See application file for complete search history.

(56) References Cited

U.S. PATENT DOCUMENTS

| | | | |
|---|---|---|---|
| 6,678,394 B1 | 1/2004 | Nichani | |
| 8,378,671 B1 | 2/2013 | Mahoney | |
| 8,378,803 B1 | 2/2013 | Keiser | |
| 9,467,792 B2* | 10/2016 | Morrow | H04R 3/12 |
| 11,187,793 B1 | 11/2021 | Liu | |
| 2003/0030554 A1 | 2/2003 | Yavitz | |
| 2004/0080621 A1 | 4/2004 | Fisher et al. | |
| 2005/0021745 A1 | 1/2005 | Bookman et al. | |
| 2006/0284839 A1* | 12/2006 | Breed | B62D 1/046 345/156 |
| 2007/0120334 A1 | 5/2007 | Holbrook | |
| 2012/0226548 A1 | 9/2012 | Hanna | |
| 2013/0224721 A1 | 8/2013 | Gilling | |
| 2014/0330576 A1 | 11/2014 | Bauer | |
| 2016/0217102 A1* | 7/2016 | Eguchi | G06F 13/4282 |
| 2017/0028946 A1 | 2/2017 | Mizell et al. | |
| 2018/0107215 A1 | 4/2018 | Djuric et al. | |
| 2018/0232585 A1 | 8/2018 | Kim | |
| 2018/0281815 A1* | 10/2018 | Stentz | H04W 4/40 |
| 2019/0171215 A1* | 6/2019 | Tatourian | G05D 1/0246 |
| 2019/0180526 A1 | 6/2019 | Mehdizade et al. | |
| 2019/0204832 A1 | 7/2019 | Abeloe | |
| 2019/0220011 A1* | 7/2019 | Della Penna | G05D 1/0212 |
| 2019/0281276 A1* | 9/2019 | Wang | G01S 7/4863 |
| 2019/0361764 A1 | 11/2019 | Sari | |
| 2020/0118451 A1* | 4/2020 | Dawson-Townsend | G06V 20/10 |
| 2020/0393506 A1* | 12/2020 | Landman | G01R 31/3016 |
| 2021/0197805 A1* | 7/2021 | Robbel | G06V 10/811 |
| 2021/0294944 A1* | 9/2021 | Nassar | G06F 11/3664 |

OTHER PUBLICATIONS

Meyer et al., "LaserNet: An Efficient Probabilistic 3D Object Detector for Autonomous Driving", arXiv:1903v1, Mar. 20, 2019, 10 pages.
Scinteie, Emerging Technologies for Diversified Autonomous Transportation, Rail Conference, 23 pages.
International Preliminary Report on Patentability for Application No. PCT/US2021/01984, dated Feb. 26, 2021, 14 pages.
International Search Report and Written Opinion for Application No. PCT/US2021/019844, dated Jul. 12, 2021, 18 pages.
U.S. Appl. No. 16/893,617, filed Jun. 5, 2020, 97 pages.
U.S. Appl. No. 16/893,657, filed Jun. 5, 2020, 97 pages.

* cited by examiner

ASYNCHRONOUS PROCESSING FOR AUTONOMOUS VEHICLE COMPUTING SYSTEMS

PRIORITY CLAIM

The present application is based on and claims benefit of U.S. Provisional Application 63/002,675 having a filing date of Mar. 31, 2020, which is incorporated by reference herein.

FIELD

The present disclosure relates generally to a compute architecture for an autonomous vehicle computing system. More particularly, the present disclosure relates to systems and methods that provide an autonomy compute architecture configured to allow assured processing of outputs in an autonomous vehicle computing system.

BACKGROUND

Functional safety standards have been commonly utilized and relied upon in the automotive manufacturing industry. Some standards that are commonly followed in vehicle production, such as ISO 26262, define hardware and software standards that assure the proper functionality of vehicles and vehicle computing systems. However, when strictly implemented, these standards can be incompatible with the implementation of autonomous vehicle functionality. Further, the standards generally specify inflexible decomposition methodologies. Thus, providing assurance for processing operations of an autonomy computing system as directed by current specifications has presented a significant challenge to the implementation of safe autonomous functionality.

SUMMARY

Aspects and advantages of embodiments of the present disclosure will be set forth in part in the following description, or can be learned from the description, or can be learned through practice of the embodiments.

One example aspect of the present disclosure is directed to an autonomy computing system for an autonomous vehicle. The autonomy computing system can include a plurality of functional circuits associated with a first autonomous compute function of the autonomous vehicle, each of the plurality of functional circuits configured to, according to a specified order, obtain sensor data associated with a sensor system of the autonomous vehicle, the sensor data describing one or more aspects of an environment external to the autonomous vehicle at a current time, each of the plurality of functional circuits configured to generate, over a time period and based at least in part on the sensor data, a respective output according to the specified order. The autonomy computing system can include one or more monitoring circuits configured to evaluate, according to the specified order, an output consistency of the respective outputs, and in response to detecting an output inconsistency between two or more of the respective outputs, generate data indicative of a detected anomaly associated with the first autonomous compute function.

Another aspect of the present disclosure is directed to a computer-implemented method for verifying autonomous vehicle compute processing. The method can include obtaining, by a plurality of functional circuits of an autonomy computing system, sensor data associated with a sensor system of the autonomous vehicle, the sensor data describing one or more aspects of an environment external to the autonomous vehicle at a current time, each of the plurality of functional circuits respectively associated with a first autonomous compute function of the autonomy computing system. The method can include generating, by each of the plurality of functional circuits and according to a specified order, a plurality of outputs, each of the plurality of outputs generated over a time period. The method can include evaluating, by one or more monitoring circuits of the autonomy computing system and according to the specified order, an output consistency of the respective outputs. The method can include, in response to detecting an output inconsistency between two or more of the respective outputs, generating, by the autonomy computing system, data indicative of a detected anomaly associated with the first autonomous compute function.

Another aspect of the present disclosure is directed to an autonomous vehicle. The autonomous vehicle can include a sensor system configured to generate sensor data associated with an environment external to the autonomous vehicle. The autonomous vehicle can include an autonomy computing system. The autonomy computing system can include a plurality of functional circuits associated with a first autonomous compute function of the autonomous vehicle, each of the plurality of functional circuits configured to, according to a specified order, obtain sensor data associated with the sensor system of the autonomous vehicle, the sensor data describing one or more aspects of an environment external to the autonomous vehicle at a current time, each of the plurality of functional circuits configured to generate, over a time period and based at least in part on the sensor data, a respective output according to the specified order. The autonomy computing system can include one or more monitoring circuits configured to evaluate, according to the specified order, an output consistency of the respective outputs, and in response to detecting an output inconsistency between two or more of the respective outputs, generate data indicative of a detected anomaly associated with the first autonomous compute function. The autonomous vehicle can include a vehicle control system configured to generate one or more vehicle control signals for the autonomous vehicle based at least in part on one or more outputs of the autonomy computing system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
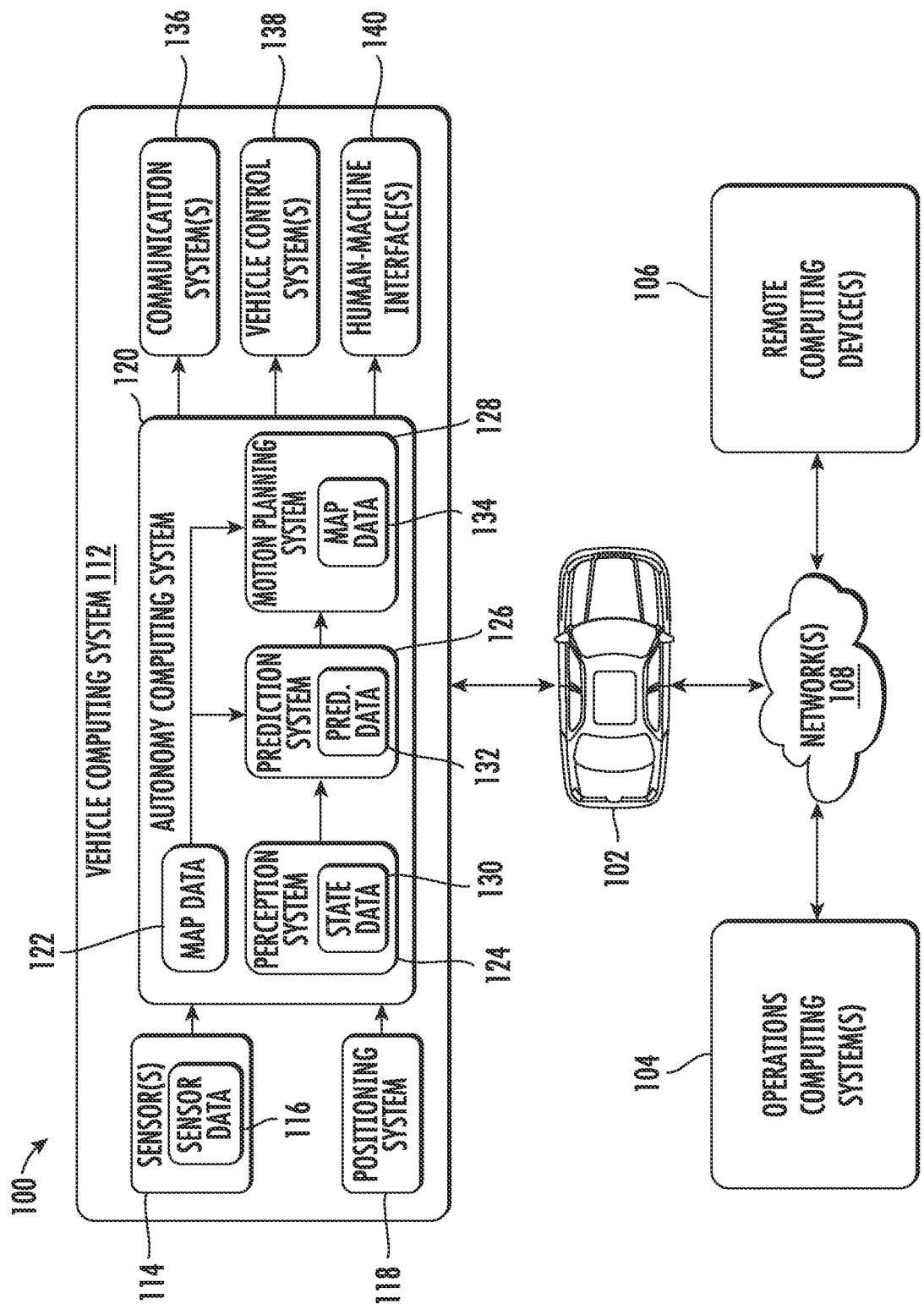
FIG. 1 depicts an example system overview including an autonomous vehicle according to example embodiments of the present disclosure.

Example aspects of the present disclosure are directed to an autonomous vehicle compute architecture configured to assure autonomous vehicle computing system functionality. More particularly, the example systems and methods described herein are directed to an autonomy computing system that includes a plurality of functional circuits (e.g., non-assured compute hardware, etc.) and monitoring circuits (e.g., virtualized and/or non-virtualized assured compute hardware, etc.). Each of the functional circuits is capable of producing outputs for the autonomy computing system. In turn, the autonomy computing system can utilize the plurality of functional circuits to assure the validity of an output by generating a plurality of outputs and evaluating a consistency between the outputs. For example, the autonomous vehicle can obtain sensor data from a sensor system of the autonomous vehicle and process the sensor data using two or more functional circuits to generate two individual outputs associated with an autonomous compute function. The autonomous vehicle computing system can determine if significant differences exist between the two outputs (e.g., by using an assured monitoring circuit, validating the outputs using opposite functional circuitries, etc.). For example, if the difference(s) between the outputs does not satisfy a threshold difference (e.g., trajectory outputs deviate by a certain degree, only one output recognizes the presence of an object, etc.), the autonomy computing system can operate in a normal operational state, for instance by selecting one of the outputs or combining the outputs for use in generating motion plans, control signals, etc. for the autonomous vehicle. If the difference(s) between the outputs satisfies a threshold difference, however, the autonomy computing system can initiate one or more actions, such as by generating a motion plan to bring the vehicle to a safe stop. As another example, the autonomy computing system can process the sensor data using a plurality of functional circuits in a specified order (e.g., processing sensor data obtained at time 1 with first processing circuitry, processing sensor data obtained at time 2 with second processing circuitry, etc.). The autonomous vehicle computing system can utilize monitoring circuitry to determine a level of consistency across the outputs of the functional circuits, and can determine an optimal output based on this consistency. Thus, example embodiments in accordance with the present disclosure can provide an autonomy computing system including a compute architecture that enables assured compute processing by evaluating differences across the outputs of multiple functional circuits. In addition, the compute architecture can provide improved availability by enabling the autonomy computing system to operate using a single functional circuit for an autonomous compute function in the event that the system detects an anomaly with a second functional circuit.

Functional safety standards have been commonly utilized and relied upon in the automotive manufacturing industry. Some standards that are commonly followed in vehicle production, such as ISO 26262, define hardware and software standards that assure the proper functionality of vehicles and vehicle computing systems. However, when strictly implemented, these standards can be incompatible with the implementation of autonomous vehicle functionality. As an example, most high-performance processors from industry leading manufacturers (e.g., AMD Epycm, Intel Xeon™, etc.) are not certified at the highest level of assurance required by ISO 26262 (e.g., ASIL D hardware certifications). As another example, the outputs from autonomous vehicle computing systems are often stochastic (e.g., an output from a machine-learned model, etc.) rather than deterministic, while most safety standards require that the outputs of a vehicle computing system be deterministic for a highest level of assurance. As such, the software and the system outputs cannot be certified at a highest level of assurance in many traditional systems.

In accordance with example embodiments of the present disclosure, an autonomy computing system for an autonomous vehicle can include a compute architecture that provides a plurality of functional circuits, each capable of producing outputs for the autonomy computing system. In addition, the compute architecture provides one or more monitoring circuits to monitor the operation of the functional circuits and detect differences across the plurality of outputs of the functional circuits. In such fashion, the compute architecture provides an autonomy computing system with the capability to generate an assured output for various autonomous compute functions by evaluating whether multiple outputs for the same function from separate processing circuitry are similar to a degree that statistically assures the correctness of the outputs.

More particularly, an autonomy computing system can include an autonomous vehicle compute architecture including a plurality of functional circuits configured to produce outputs for the autonomous vehicle computing system (e.g., motion plans, perception data, prediction data such as object trajectories, world states, etc.). In some implementations, a functional circuit can include one or more processors (e.g., central processing unit(s) (CPUs), CPU core(s), graphics processing unit(s) (GPUs), application-specific integrated circuit(s) (ASICs), field-programmable gate array(s), or any other sort of integrated circuit or processing apparatus. As an example, a functional circuit in some examples may include two CPUs, four GPUs, and two FPGAs. As another example, a functional circuit can include one CPU core and two GPUs. As such, a single multicore CPU can, in some implementations, have a first core of the CPU included in a first functional circuit and a second core included in a second functional circuit. It should be noted that in some implementations, the processor(s) of the functional circuit can be communicatively connected to other processor(s) of the same functional circuit and/or other functional circuits. As an example, a CPU of a first functional circuit can be communicatively coupled to a CPU of a second functional circuit (e.g., through respective ethernet-connected chipsets, interconnects, shared memory, etc.). This communication link can provide redundant communication channels between functional circuits in the case that a main processor communication channel (e.g., a communication switch, etc.) fails.

In some implementations, a functional circuit can include one or more memories (e.g., random access memory (RAM), flash memory, solid-state storage device(s) (SSDs), magnetic storage drive, etc.). These one or more memories can be communicatively connected to and/or utilized by one or more other components of the functional circuit. As an example, the functional circuit may include two random access memory devices (e.g., two 16-gigabyte DDR4 RAM devices, etc.) that can be accessed and/or utilized by one or more processors of the functional circuit. As another example, the functional circuitry may include a plurality of solid-state storage devices (e.g., NAND-based flash memory, etc.) that can be accessed and/or utilized by one or more processors of the functional circuitry (e.g., a graphics processing unit, etc.).

In some implementations, a functional circuit can include one or more printed circuit boards (PCBs) configured to house and/or facilitate communication between components of the functional circuit. PCBs can include, for example, communication interfaces (e.g., bridges, I/O ports, ethernet ports, connectors, PCI slots, etc.) to facilitate communication between processors of the functional circuitry. For example, a PCB (e.g., a motherboard, etc.) may include a chipset (e.g., a northbridge, a southbridge, etc.) configured to facilitate communication between CPU(s), GPU(s), memory, and other components of the functional circuit. As another example, PCBs can include communication interfaces (e.g., serial ports, ethernet ports, IDE ports, SATA ports, etc.) that can be used by components of the functional circuit to communicate with other functional circuits and/or with other components of the compute architecture (e.g., monitoring circuitries, microcontroller unit(s), switch(es), etc.). The specific implementation of communication between components of the functional circuit and between components of the broader compute architecture will be discussed with greater detail as described in the figures.

It should be noted that, in some implementations, any and/or all of the component(s) of a functional circuit, and/or the functional circuit itself, can be virtualized (e.g., as a virtual component, virtual machine, container, etc.). As an example, a first processor of a first functional circuit and a second processor of a second processing circuit may both respectively be virtualized processors. As another example, a first memory of a first functional circuit and a second memory of a second functional circuit may both respectively be virtualized memory instances referencing a single physical memory. In such fashion, the autonomous vehicle compute architecture can provide the capability to dynamically generate and/or scale virtualized hardware resources based on the needs of the autonomous vehicle computing system.

The autonomous vehicle compute architecture can include one or more monitoring circuits. A monitoring circuit can, in some implementations, include any and/or all of the hardware devices previously mentioned with regards to the functional circuit. As an example, a monitoring circuit can include a PCB, a CPU, memory, and storage device(s). Further, in some implementations, the components of the monitoring circuit can be assured to a specified functional safety standard (e.g., ASIL-D of ISO 26262, etc.). More particularly, the monitoring circuit itself can be assured, and therefore, with the right considerations, the monitor circuit can assure the functionality of outputs of the functional circuits and/or assure the proper operation of the functional circuits themselves.

In some implementations, monitoring circuitry, and/or various components of the monitoring circuitry, can be virtualized (e.g., as a virtual machine, virtual device, container, etc.). As an example, two separate monitoring circuits can be virtualized monitoring circuits. It should be noted that the functional safety certification of a physical monitoring circuitry can, in some implementations, extend to virtualized monitoring circuitries executed by the physical circuitry. As an example, an ASIL-D certified physical monitoring circuitry can execute one or more virtual monitoring circuits that are also ASIL-D certified.

In some implementations, the monitoring circuitry can assure the proper operation of the functional circuitry. The monitoring circuitry can evaluate various aspects of the functional circuitry while the circuitry performs processing operations. As an example, the monitoring circuitry may evaluate aspects of a CPU of the functional circuitry (e.g., clock error reporting, voltage monitoring, error collection, clock frequency monitoring, etc.). As another example, the monitoring circuitry may evaluate aspects of two GPUs of the functional circuitry (e.g., clock error reporting, voltage monitoring, clock frequency monitoring, etc.). In some implementations, a number of monitoring circuitries can be used to monitor an equal number of functional circuitries. In some alternative implementations, a fewer number of monitoring circuitries can be used to monitor a plurality of functional circuits.

In some implementations, the autonomous vehicle compute architecture can include one or more communication switches to facilitate communication between sensor systems of the autonomous vehicle, functional circuitries, monitoring circuitries, and any other components of the autonomous vehicle. As an example, a sensor system of the autonomous vehicle can send sensor data to a communication switch in the autonomous vehicle computing system. The communication switch can receive the sensor data and send the sensor data to each of the functional circuits (e.g., through network port(s) of a motherboard of the functional circuitry, etc.). Further, the functional circuits can send outputs directly to monitoring circuits and/or to the communication switch for transmittal to the monitoring circuits. Similarly, the monitoring circuitry can send an optimal output (e.g., a result of monitoring the output of the functional circuitries, etc.) to the communication switch. In some implementations, the communication switch can receive outputs from processing circuitries and send the outputs to other components and/or systems of the autonomous vehicle (e.g., a microcontroller unit, a vehicle integration module, a vehicle controller, etc.). Thus, in such fashion, the communication switch(es) can facilitate communication between each component, subcomponent, and/or system of the autonomous vehicle compute architecture.

The circuits of the autonomous vehicle compute architecture can, in conjunction, provide for verified autonomous vehicle compute processing in an autonomous vehicle computing system. More particularly, data associated with a sensor system of the autonomous vehicle can be provided to first functional circuitry and second functional circuitry of the autonomous vehicle. The first functional circuitry can be configured to generate one or more first outputs (e.g., motion plan(s), object trajectories, etc.), and the second functional circuitry can be configured to generate one or more second outputs. Both the one or more first outputs and the one or more second outputs can be associated with the same autonomous function of the vehicle (e.g., motion planning, object recognition, object classification, pose calculation(s), etc.). As an example, both the first output(s) and the second output(s) can be motion plans for the autonomous vehicle. As another example, both the first output(s) and the second output(s) can be identifications of a moving object in an environment external to the autonomous vehicle. The associated autonomous function of the vehicle can, in some implementations, be any sort of processing task and/or operation associated with the autonomous functionality of the vehicle. In such fashion, the functional circuitries can generate outputs in a "lockstep" manner to assure proper output functionality and also provide multiple redundancies in the case of system failures.

In some implementations, separate first functional circuitry and second functional circuitry can utilize the same algorithm(s) to generate the first output(s) and the second output(s). As an example, both the first functional circuitry and the second functional circuitry may respectively utilize machine-learned models (e.g., a neural network, etc.) configured to perform the same function and to generate outputs. Alternatively, in some implementations, the first functional circuitry and the second functional circuitry can use different algorithms to generate the outputs from the sensor data. As an example, the first functional circuitry may utilize a first machine-learned model (e.g., a convolutional neural network, recurrent neural network, etc.) trained on a first set of training data, while the second functional circuitry may utilize a second machine-learned model trained on a second set of training data. In such fashion, the autonomous vehicle computing system can utilize different algorithms to generate and evaluate outputs associated with the same autonomous compute function.

In some implementations, two or more functional circuits of the autonomy computing system can generate outputs at different rates. More particularly, first functional circuitry can generate first output data at a first frequency while second functional circuitry can generate second output data at a second frequency that is lower than the first frequency. As an example, the first functional circuitry can generate five outputs in the amount of time that the second functional circuitry can generate one output. In some implementations, the difference in processing frequency between functional circuitries can stem from a difference in the hardware resources or other compute capacity of the functional circuitry. As an example, the first functional circuitry can include two CPUs and four GPUs while the second functional circuitry includes one CPU and one GPU. Although the first and second functional circuitries can produce outputs at different frequencies, the monitoring circuitry can compare the outputs to detect anomalies. As an example, the monitoring circuitry can perform an evaluation and generate an output at the frequency of the slower functional circuitry in examples embodiments. For instance, the first functional circuitry may produce four outputs while the second functional circuitry produces one output. The monitoring circuitry can compare the first generated output of the first functional circuitry and the first generated output of the second functional circuitry. In such fashion, a functional circuitry with less compute capacity can be used to assure the functionality of the outputs of a more computationally capable functional circuitry.

The one or more monitoring circuits of the autonomous vehicle computing system can be used to determine a difference between the first and second outputs of the functional circuits. More particularly, monitoring circuitry can generate comparative data associated with one or more differences between the first output data and the second output data. As an example, first output data may indicate a first output describing a first trajectory of an object external to the autonomous vehicle while second output data may indicate a second trajectory of the object. If the first trajectory and the second trajectory are within a certain degree of similarity, the comparative data can indicate that the functionality of both outputs is assured.

It should be noted that the assurance of the functionality of both outputs is not necessarily "assurance" as defined and/or specified by a highest safety standard (e.g., ASIL-D of ISO26262). Instead, the assurance provided by ensuring a certain degree of similarity between outputs is obtained by ensuring that the stochastic outputs of the functional circuitry are similar enough to remove the chance of an aberrant output. More particularly, the stochastic outputs of the functional circuits, as discussed previously, are by definition non-deterministic and can therefore be considered incompatible with contemporary safety standards when strictly implemented. By ensuring that multiple non-deterministic algorithms (e.g., machine-learned models, neural network(s), etc.) generate stochastic outputs that are each within a degree of similarity, the autonomous vehicle computing system can ensure that the stochastic algorithms in question have generated outputs that "function" at a highest standard for safety for an autonomous vehicle (e.g., "assuring" the outputs of the functional circuits).

In some implementations, generating the comparative data can include detecting a fault within functional circuitry of the autonomous vehicle computing system. More particularly, by generating the comparative data, the monitoring circuitry can detect a fault within one or more of the associated functional circuits being compared. A fault can be detected based on a certain degree of difference (e.g., how "significant" a difference is) between outputs and/or an inherent aspect of an output (e.g., an impossible prediction, incompatible output, etc.). As an example, a first output may include a detection of an object external to the autonomous vehicle while a second output may not include a detection of the object in question. By generating the comparative data, the monitoring circuitry can detect a fault within the second functional circuit associated with the failure to recognize the object external to the autonomous vehicle. For instance, a fault can be detected based on a difference between outputs that satisfies a difference threshold.

It should be noted that the "significance" of a difference can be dependent on the output of the functional circuitry (e.g., a type of output, a timing of the output, etc.). As an example, two outputs can both represent an estimated trajectory for an object relatively far away from the autonomous vehicle. Even if the outputs are substantially different, the difference may not be significant if the utilization of either output (e.g., in motion planning, object avoidance, trajectory generation, etc.) would not be affected by the difference. As another example, both outputs may represent a stopping distance to avoid collision with a vehicle. Even if both outputs are slightly different, the difference may be significant enough to detect a fault. In such fashion, the significance or degree of difference between outputs can be heavily dependent upon the intended use and/or temporal relevance of the outputs in question.

The autonomous vehicle computing system can generate one or more motion plans based at least in part on the comparative data. In some implementations, generating the one or more motion plans can include, if either of the outputs are motion plans, selecting one of the outputs. As an example, both the first and second outputs may be motion plans. To generate the motion plan, the autonomous vehicle computing system can select either of the outputs as the motion plan. In some implementations, the outputs from the functional circuits can be data that the motion plan can be based on (e.g., a pose, vehicle trajectory, object recognition, prediction, perception, etc.). As an example, the outputs may identify a stopped vehicle in front of the autonomous vehicle. The motion plan can be generated such that the autonomous vehicle avoids the stopped vehicle. As another example, the outputs may identify a predicted object trajectory that intersects the path autonomous vehicle. The motion plan can be generated such that the autonomous vehicle moves out of the predicted object trajectory.

The autonomous vehicle computing system can generate one or more vehicle control signals for the autonomous vehicle based at least in part on the comparative data and/or one or more motion plans. In some implementations, the autonomous vehicle computing system can use one or more of the functional circuits to generate the vehicle control signals. Additionally, or alternatively, in some implementations the autonomous vehicle computing system can use a processor and/or computing device separate from the functional circuits to generate the vehicle control signals (e.g., a vehicle control system).

The vehicle control signals can be based at least in part on the comparative data associated with the difference(s) between the first output data and the second output data. As an example, both the first and second output data can be substantially similar or identical motion plans for the autonomous vehicle. Vehicle control signals can be generated that control the vehicle to operate according to one of the motion plans. As another example, the first and second output data can be predictions for the trajectory of an object external to the autonomous vehicle. Vehicle control signal(s) can be generated to control the vehicle to avoid the predicted trajectory of the object. In some examples, the autonomy computing system can select an output of one of the functional circuits as an optimal output. In some instances, the optimal output can be the output provided by one of the functional circuits implemented as a default functional circuit. In other examples, an optimal output can be selected based on an evaluation of the outputs. For instance, a probability assessment associated with the outputs can be used to select an output as an optimal output. In yet another example, a combination of the outputs from multiple functional circuits configured for the same autonomous compute function can be used.

In some implementations, emergency control signals can be generated if the comparative data indicates a fault in one or more of the functional circuitries. The emergency control signals can be configured to safely stop the autonomous vehicle (e.g., slow the vehicle, stop the vehicle, navigate the vehicle to a safe stopping location, etc.). As an example, the monitoring circuitry can detect a fault in a second functional circuitry while generating comparative data between first and second outputs. The non-faulting functional circuitry (e.g., the first functional circuitry) can be used to generate the emergency control signals to safely stop the vehicle.

In some implementations, the comparative data can be generated by validating the outputs of the functional circuits. More particularly, the monitoring circuitry can use first functional circuitry to validate a second output from second functional circuitry to generate a second output validation of the second output. The first functional circuitry can generate the second output validation by validating the second output against a world state associated with the first functional circuitry. The world state can describe a perception of the environment external to the autonomous vehicle. The second functional circuitry generate a first output validation for the first output in the same manner. Thus, in such fashion, the functional circuits can be used to cross-validate outputs to assure proper functionality of the outputs and the functional circuitry.

The processing circuitries of the autonomous vehicle compute architecture can, in conjunction, provide for verified autonomous vehicle compute processing in an autonomous vehicle computing system asynchronously. More particularly, a plurality of functional circuits can be configured to obtain sensor data associated with a sensor system of the autonomous vehicle. The sensor data can describe one or more aspects of an environment external to the autonomous vehicle at a current time. As an example, a first functional circuit can obtain sensor data depicting the environment at a first time, while a second functional circuit can obtain sensor data depicting the environment at a second time. As such, the sensor data can differ based on the time in which the sensor data was obtained.

Each of the functional circuits can be further configured to generate a respective output over a time period (e.g., an amount of time required to process the input and generate an output). The respective output (e.g., a motion plan, perception, prediction, object trajectory, pose, etc.) can be based at least in part on the sensor data. As the time period represents the amount of time required for processing over all of the functional circuitry, the time period can be variable and can vary based on the computational capacity of each functional circuit. As an example, first functional circuitry including four GPUs may generate the output over a smaller portion of the time period than second functional circuitry with a single GPU. Further, even assuming that all functional circuits have identical computational capacity, the sequential and asynchronous input of sensor data to each of the respective functional circuits can lead to a sequential and asynchronous generation of respective outputs. More particularly, the outputs can be generated in the same specified order as the inputs. As the outputs are generated, the outputs can be sent to monitoring circuitry (e.g., through the one or more communication switches, with a direct communication link from the functional circuitry to the monitor circuitry, etc.).

The functional circuits can, in some implementations, work asynchronously and in parallel. As an example, first functional circuitry can obtain sensor data and begin to generate the output over the time period. While the first functional circuitry generates the output, second functional circuitry can obtain sensor data and begin to generate the respective output over the time period. The first functional circuitry can finish generating the output and a third functional circuitry can obtain sensor data while the second functional circuitry is generating the output over the time period. As such, each of the functional circuits can work in parallel on the inputs in the order they are received.

The monitoring circuitry can be configured to evaluate the outputs according to the specified order in which the outputs are received. The specified order in which the outputs are received can be the same order in which the sensor data is obtained and the outputs are generated. By evaluating the outputs in the specified order, the monitoring circuitry can determine an output consistency of the respective outputs. More particularly, the monitoring circuitry can detect large variations between outputs over time. It should be noted that the sensor data obtained by each functional circuit can be different (e.g., based on the time it was obtained, etc.) and therefore each output should not necessarily be identical. Instead, the output consistency can measure large variations in the outputs to determine if the outputs are sufficiently consistent.

In determining the output consistency, the monitoring circuitry can, in some implementations, assign different weights to the outputs based on the specified order. As an example, the monitoring circuitry can weigh the consistency of later respective outputs over earlier respective outputs. For example, if a monitoring circuit receives five outputs where the first three outputs do not recognize an object in an environment and the last two outputs do recognize an object in the environment, the monitoring circuit can still find a sufficient level of consistency between the results, as the consistency of the last two outputs can be weighed more heavily as they are more temporally relevant than the first three outputs. As such, the temporal recency of the outputs can be considered and utilized in the weighting of consistency between outputs by the monitoring circuit.

The level of output consistency required can, in some implementations, be specified by a consistency threshold (e.g., a discrete value, etc.). As an example, the monitoring circuit may assign a percentage level of consistency to the results, which can fall above or below a predetermined consistency threshold. The consistency threshold can be determined by the autonomy computing system, and can dynamically vary based on one or more aspects of the autonomous vehicle's operation (e.g., previous faults, weather, environment, previously detected objects, etc.). As an example, if faults have already been detected in the computing system's operation, the consistency threshold may be raised to further assure the proper functionality of the autonomy computing system. As another example, if the weather in the environment external to the autonomous vehicle is poor (e.g., raining, fog, etc.), the consistency threshold may be raised to assure proper functionality.

Additionally, or alternatively, in some implementations, the monitoring circuit can weigh the consistency of various outputs based on an algorithm (e.g., deterministic algorithm, neural network, machine-learned model, etc.) used to generate the output. As an example, first functional circuitry may use a recently developed machine-learned model to generate a first output. Second, third, and fourth functional circuits may each use a previously tested machine-learned model to generate the respective outputs. The monitoring circuitry can assign a certain weight to the first output when evaluating an output consistency such that even if the first output is strongly inconsistent, an overall output consistency can be found to exist. As another example, if three functional processing circuitries generated three outputs using three instances of a neural network, and a fourth functional circuitry generated a fourth output using a deterministic algorithm, the monitoring circuitry can weigh the consistency of the fourth output more heavily such that inconsistency can be found even if each of the first three functional circuitries are significantly consistent.

The monitoring circuitry can detect that an output is inconsistent across the respective outputs. In response to detecting that the outputs are inconsistent, the monitoring circuitry can generate data indicative of a detected anomaly associated with the first autonomous function. The detected anomaly can be based on one or more aspects of the detected output inconsistency. As an example, the monitoring circuit can receive four object trajectories. The first two object trajectories can indicate that an object trajectory does not intersect the autonomous vehicle while the last two object trajectories can indicate that the object trajectory does intersect the vehicle. The detected anomaly can indicate an anomaly between the results of the functional circuitries.

In some implementations, one or more of the functional circuitries can be configured to safely stop the vehicle based on the output inconsistency. More particularly, one or more of the functional circuitries can generate control signals to execute a safe-stop maneuver. The safe-stop maneuver can be configured to stop the vehicle as quickly as possible in a safe and controlled fashion. As an example, the safe-stop maneuver can be configured to quickly pull the vehicle over to the shoulder and stop the vehicle on the shoulder.

In some implementations, one or more of the functional circuitries can be configured to determine an optimal output based on the output consistency. Using the previous example of the four object trajectories, the one or more functional circuitries may determine that the optimal output should include the object trajectory of the first two outputs that intersects the path of the autonomous vehicle. As another example, the one or more functional circuitries may, in response to the inconsistency detected by the monitoring circuit, generate emergency control signals configured to safely stop the autonomous vehicle (e.g., slowly bring the autonomous vehicle to a stop, navigate the autonomous vehicle out of the possible path of the intersecting object and stop the autonomous vehicle, etc.).

In some implementations, both the functional circuitries and the monitoring circuitries of the autonomous vehicle compute architecture can be assured. More specifically, both can utilize software (e.g., algorithm(s), instructions, operating system(s), etc.) and compute hardware that are assured to a highest level of a functional safety standard (e.g., ASIL-D of ISO26262, etc.). In some implementations, if the hardware and software of a functional circuit is assured, an assured output can be generated solely from a single functional circuit without the use of monitoring circuitry or an additional functional circuit. As an example, an assured functional circuit may include an ASIL-D certified central processing unit, an ASIL-D certified operating system, and one or more ASIL-D certified deterministic algorithms. The assured functional circuitry can generate an ASIL-D output for a non-stochastic autonomous function of the autonomous vehicle (e.g., user interface generation, vehicle lighting controls, climate control, etc.). It should be noted that although monitoring circuitry is not required to check the output of the assured functional circuitry, monitoring circuitry can still be utilized to monitor the proper internal operation of the assured functional circuitry (e.g., CPU voltages, CPU frequency variations, GPU temperatures, etc.).

In some implementations, the hardware of functional circuitry can be assured and the software can be certified to generate functional statistical outputs (e.g., certified to the state of the intended function (SOTIF certified), etc.). More particularly, the stochastic algorithms utilized by the functional circuitry (e.g., machine-learned models, neural network(s), etc.) can be certified as being developed, verified, and validated in manner sufficient to comply with a highest level of certain safety standards (e.g., SOTIF of ISO/PAS 21448, UL 4600, etc.).

In some implementations, non-assured functional circuitry can be "checked" by assured monitoring circuitry (e.g., ASIL-D certified, etc.). More particularly, the output of the non-assured functional circuitry (e.g., functional circuitry that does not produce an assured output, functional circuitry that is not monitored by an assured circuitry, etc.) can be verified by assured monitoring circuitry. In such fashion, the functional circuitry-monitoring circuitry pair can operate in a "doer-checker" manner. In some implementations, the functional circuitries can dynamically switch between any of the other previous methods and/or configurations described previously (e.g., "lockstep" configurations, "asynchronous" configurations, etc.) and a "doer-checker" configuration based on one or more aspects of the compute task requested.

More particularly, for some compute tasks (e.g., stochastic output generation using machine-learned models, etc.), a "doer-checker" configuration can require that the computational complexity of the operations of the monitoring circuitry (e.g., the "checking") is equal to that of the operations of the functional circuitry (e.g., the "doing"). As an example, the verification of an object trajectory output by a monitoring circuitry can, in some instances, be extremely computationally complex. In other instances, the output of the functional circuitry cannot be properly verified using ASIL-D hardware of a monitoring circuitry. In such instances, the processing circuitries can utilize one of the previously described configurations (e.g., a "lockstep" configuration, an "asynchronous" configuration, etc.) to assure the functionality of the outputs.

In other instances, an output of the functional processing circuitry can be more easily validated by monitoring circuitry. As an example, a deterministic output from a functional circuitry (e.g., a trajectory calculation, etc.) can be easily verified by the monitoring circuitry. As another example, some stochastic outputs (e.g., a motion plan, etc.) can, in some circumstances, be properly assured by the monitoring circuitry. In such instances, the processing circuitries may utilize a "doer-checker" configuration.

Embodiments in accordance with the disclosed technology provide a number of technical effects and benefits, particularly in the areas of computing technology, autonomous vehicles, and the integration of computing technology with autonomous vehicles. In particular, example implementations of the disclosed technology provide the capability to assure non-deterministic compute outputs for an autonomous vehicle computing system. For example, by utilizing one or more implementations of the disclosed technology, a vehicle computing system can verify that an output (e.g., a prediction, perception, motion plan, etc.) is functionally correct by generating a plurality of outputs for a single task and comparing differences between the outputs. As such, the autonomous vehicle computing system can assure outputs that are generally considered to be non-assurable. By more accurately and efficiently assuring the outputs of the autonomous vehicle computing system, embodiments in accordance with the present disclosure can significantly increase the safe function of the autonomous vehicle computing system, therefore increasing the safety of the passengers of an autonomous vehicle.

As another technical effect and benefit, the systems and methods of the present embodiments provide for multiple system redundancies in the case of hardware, software, and/or system failure. By generating multiple outputs for the same compute task, the autonomous vehicle computing system is provided with multiple outputs to utilize if one or more outputs are determined to be inconsistent or otherwise unusable. Further, if a component of the autonomous vehicle computing system was to fail (e.g., a switch, a functional circuitry, a monitoring circuitry, etc.), multiple redundant instances of these components exist and can provide critical backup functionality for the operations of the autonomous vehicle computing system. As such, the present embodiments provide several layers of redundancy for critical components of the autonomous vehicle computing system, therefore minimizing the chance of a full system failure and significantly increasing the safety of passengers of the autonomous vehicle.

Various means can be configured to perform the methods and processes described herein. For example, a computing system can include sensor data obtaining unit(s), functional circuitry unit(s), monitoring circuitry unit(s), vehicle control signal generation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data (e.g., sensor data) from an autonomous vehicle that includes sensor data that describes one or more aspects of an environment external to the autonomous vehicle. A sensor data obtaining unit is an example of means obtaining such data from an autonomous vehicle at an autonomy computing system as described herein.

The means can be configured to generate outputs for the autonomous vehicle. For example, the means can be configured to use functional circuitry to generate motion plan(s) for the autonomous vehicle. In some examples, the means can be configured to generate one or more first outputs associated with a first autonomous compute function of the autonomy computing system. In some examples, the means can be configured to generate one or more second outputs associated with the first autonomous compute function of the autonomy computing system. The means can be configured to generate, based on the data associated with the sensor system, one or more first outputs using one or more first neural networks associated with an autonomous compute function of the autonomous vehicle. The means can be configured to generate, using the one or more first neural networks associated with the autonomous compute function, a second output validation for one or more second outputs of second functional circuitry of the autonomous vehicle. The means can be configured to generate, based on the data associated with the sensor system, one or more second outputs using the one or more second neural networks, and generate, using the second one or more neural networks, a first output validation for the one or more first outputs of the first functional circuitry. In some examples, the means can be associated with a first autonomous compute function of the autonomous vehicle and can be configured to, according to a specified order, obtain sensor data associated with a sensor system of the autonomous vehicle and generate, over a time period and based at least in part on the sensor data, a respective output according to the specified order. A functional circuitry unit is one example of a means for generating functional outputs for the autonomous vehicle computing system as described herein.

The means can be configured to utilize monitoring circuitry to monitor the outputs of the functional circuitry of the autonomous vehicle. For example, monitoring circuitry can be configured to determine a consistency between a first output of a first functional circuitry and a second output of a second functional circuitry. The consistency can quantize the difference between the outputs of the respective functional circuits. The means can be configured to generate comparative data associated with one or more differences between the first output data associated with the first autonomous function of the autonomy computing system and the second output data associated with the first autonomous function of the autonomy computing system. The means can be configured to evaluate, according to the specified order, an output consistency of the respective outputs, and in response to detecting an output inconsistency between two or more of the respective outputs, generate data indicative of a detected anomaly associated with the first autonomous compute function. A monitoring circuitry unit is one example of a means for monitoring the outputs and/or operation(s) of functional circuit(s).

The means can be configured to generate motion plan(s) based on the outputs of the monitoring circuitry units. For example, motion plan generation unit(s) can be configured to generate one or more motion plan(s) based on a difference between a first output of a first functional circuitry and a second output of a second functional circuitry. The motion plan can be based on a difference threshold between the two functional circuits. A motion plan generation unit is one example of a means for generating motion plan(s) for an autonomous vehicle based on the difference between output(s).

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art. With reference to the figures, example embodiments of the present disclosure will be discussed in further detail.

FIG. 1 depicts a block diagram of an example system 100 for controlling the computational functions of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 to determine if the computational resources (e.g., vehicle computing system 112) is unused or under-utilized. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the current or forecasted navigational route of the vehicle, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. As one example, the vehicle computing system 112 can include specialized hardware devices for autonomous driving data processing (e.g., graphics processing units, hardware accelerators, etc.). These specialized hardware devices can possess processing capacity sufficient to process data in the worst-case data processing situations the autonomous vehicle can encounter (e.g., left turns in an urban environment, rain/snow conditions, etc.). As another example, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

The various compute resources of the vehicle computing system 112 and/or the autonomy computing system 120 can be selected, configured, and/or utilized according to an autonomy compute architecture. The autonomy compute architecture can specify the configuration and selection of functional circuitries (e.g., memories, processors, flash memory, physical storage, switches, network connections and/or layouts, etc.) such that the functional circuitries of the autonomous vehicle computing system can provide assured, non-deterministic outputs for an autonomous vehicle computing system (e.g., the vehicle computing system 112, the autonomy computing system 120, etc.). As an example, the autonomy compute architecture may specify a bifurcated processing configuration where first functional circuitry and second functional circuitry are configured to utilize identical hardware resources (e.g., functional circuitry, etc.) to generate identical outputs (e.g., non-deterministic autonomy outputs, deterministic outputs, etc.). As another example, the autonomy compute architecture may specify a plurality of functional circuits each configured to utilize different hardware resources (e.g., differing amounts of compute power, different hardware configurations, etc.) to generate identical outputs in an asynchronous manner. The various specifications and/or configurations of the autonomy compute architecture will be discussed in greater detail with regards to FIGS. 2-5.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

It should be noted that, in some implementations, the functionality of the outputs of the perception system 124, the prediction system 126, and/or the motion planning system 128 can be implemented using the functional circuitry and/or the configuration(s) specified by the autonomous compute architecture. More particularly, the systems (e.g., 124, 126, 128, etc.) of the autonomy computing system can receive input(s) (e.g., map data 122, state data 130, etc.) and generate output(s) (e.g., prediction data 132, motion planning data 134, etc.) in a configuration specified by the autonomy compute architecture such that the output(s) of the systems are assured. As an example, two mirrored functional circuitries of the computing system (e.g., the vehicle computing system 112, the autonomy computing system 120, etc.) can each respectively receive the same prediction data 132 and generate two motion planning data outputs 134. Although the two outputs of the functional circuitries may not necessarily be identical, a degree of difference can be evaluated between the two outputs to assure the proper functionality of the two outputs. In such fashion, by processing according to a configuration specified by the autonomy compute architecture, the output(s) of the system(s) (e.g., 124, 126, 128, etc.) of the autonomy computing system 120 can be assured.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
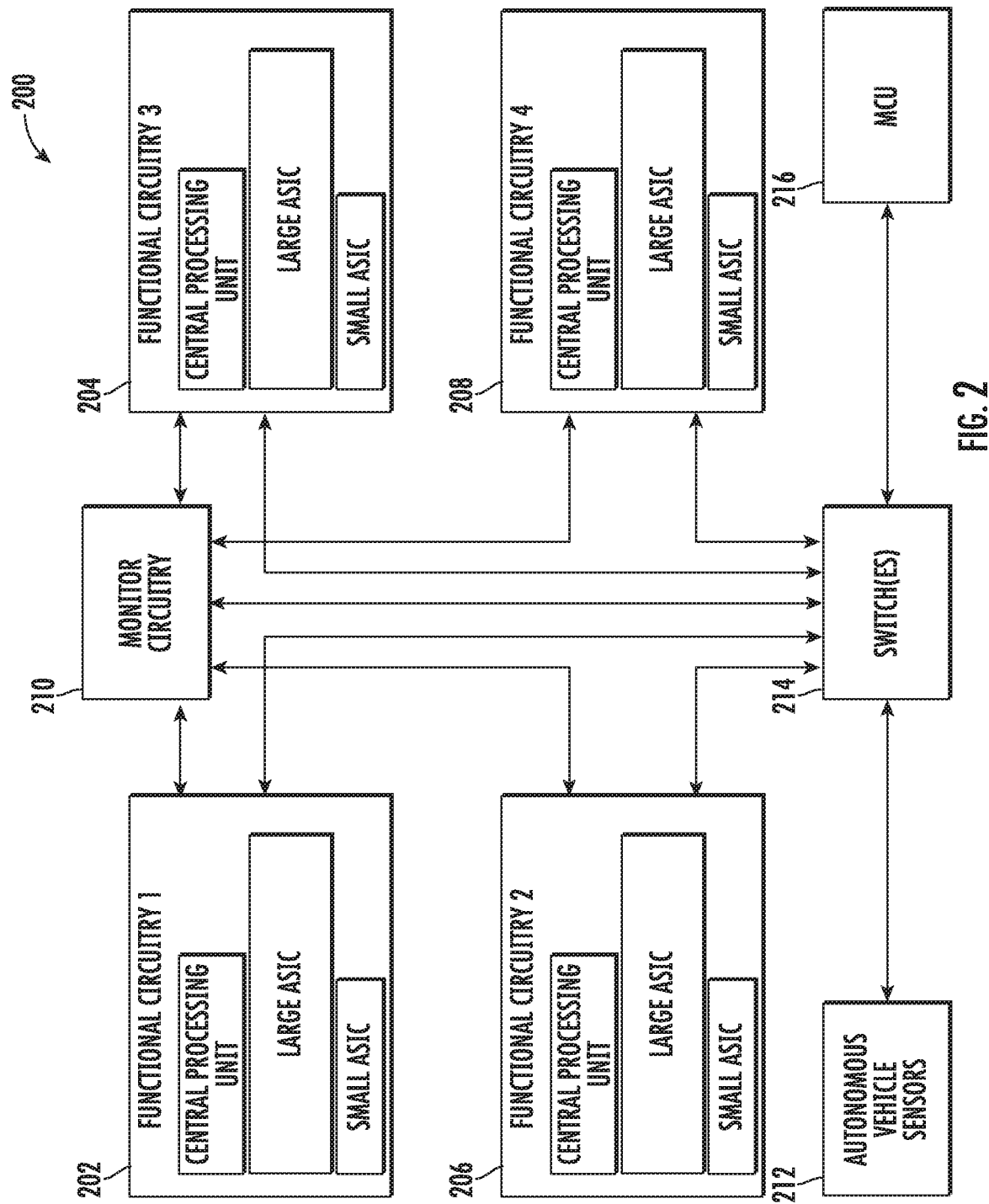
FIG. 2 depicts an example autonomous vehicle computing system according to example embodiments of the present disclosure.

FIG. 2 depicts an example autonomous vehicle computing system 200 according to example embodiments of the present disclosure. It should be noted that the autonomous vehicle computing system 200, as depicted, does not necessarily include all hardware, functional circuitries, connections, or any other aspects of the autonomous vehicle computing system 200. Instead, the autonomous vehicle computing system 200 (e.g., an autonomy computing system, a vehicle computing system, etc.) is depicted to demonstrate certain aspects of the computing system (e.g., functional circuitry configurations, hardware resources, etc.).

The autonomous vehicle computing system 200 can include one or more functional circuits (e.g., functional circuits 202, 204, 206, etc.). It should be noted that a functional circuit can also be referred to as functional circuitry. As such, a single functional circuit may also be referred to as functionality circuitry and multiple functional circuits may be referred to as functionality circuitry or a plurality of functional circuits in the description. A functional circuit can be or otherwise include one or more hardware computing components (e.g., processor(s), processor core(s), accelerator(s), storage, random access memory (RAM), chipset(s), motherboard(s), ASIC(s), a single circuit, etc.). As an example, functional circuitry 202 can include central processing unit (CPU), a large ASIC (e.g., a graphics processing unit (GPU), a neural network accelerator, etc.), and a small ASIC. The depiction of hardware components in the functional circuits of FIG. 2 (e.g., 202, 204, 206, etc.) is merely for purposes of demonstration. As such, any and all other hardware components not depicted (e.g., memory, storage, etc.) can, in some implementations, be included in the functional circuits of FIG. 2.

According to example embodiments, different processing units or other functional circuits can have different processing capabilities or computational resources. For example, a first processing unit or core may have a larger computational capacity or larger amount of computational resources relative to a second processing unit or core. By way of example, a computational capacity or computational resource may refer to processing speed, transfer speed, bandwidth, amount of memory, or other computing related resource. As such, terms such as a larger processing unit or larger ASIC may refer to a larger computational capacity of the ASIC relative to another ASIC. Similarly, terms such as a smaller processing unit or smaller ASIC may refer to a smaller computational capacity of the ASIC relative to another ASIC. As an example, a large graphics processing unit may have a larger computational capacity (e.g., due to a certain processing architecture, different memory technology, etc.) than a "smaller" graphics processing unit, even if the "smaller" graphics processing unit has more circuitry (e.g., more transistors, etc.). In some implementations, the terms large ASIC and small ASIC can refer to a physical size of the respective circuitry. As an example, a large graphics processing unit may have a larger amount of circuitry (e.g., a larger processor die size, more transistors, etc.) than a small graphics processing unit, even if the actual physical size of the entire graphics processing unit (e.g., including circuit board(s), cooling hardware, etc.) is the same between both graphics processing units.

Functional circuits 204, 206, and 208, as depicted, each include the same hardware components as functional circuitry 202. However, in some implementations, any of the functional circuits (e.g., functional circuits 202, 204, 206, 208, etc.) can utilize any variety of hardware components. More particularly, the specific configuration (e.g., inclusion or exclusion of hardware component(s), etc.) of each functional circuit can be different or identical to any other functional circuitry.

The functional circuits (e.g., 202, 204, 206, 208, etc.) can receive an input and generate an output. More particularly, each of the functional circuits can perform operations (e.g., processing operations, etc.) in accordance with any of the systems described in FIG. 1. As an example, functional circuits 202 and 204 can each perform the operations of the perception system 124 of the autonomy computing system 120 of FIG. 1 by receiving map data 122 and generating state data 130. As another example, functional circuits 202, 204, 206, and 208 can each perform the operations of the motion planning system 128 of the autonomy computing system 120 of FIG. 1 by receiving prediction data 132 and generating motion planning data 134. In such fashion, each of the functional circuits can independently generate outputs based on the same input in the manner described for the system(s) of the autonomy computing system (e.g., the perception system, the prediction system, the motion planning system, etc.). It should be noted that the outputs of the functional circuits (e.g., 202, 204, etc.) can be generated based at least in part on machine-learned model(s), and as such can, in some implementations, be non-deterministic. More particularly, the non-deterministic outputs of the functional circuits are not necessarily identical for all operations. Thus, the functional circuits (e.g., 202, 204, 206, etc.) can, in some implementations, be non-assured functional circuits (e.g., functional circuits that do not generate independently assured outputs).

The autonomous vehicle computing system 200 can include one or more switches 214. The switch(es) 214 can communicatively couple the circuits and other components of the autonomous vehicle computing system 200 (e.g., the functional circuits 202-208, the autonomous vehicle sensors 212, monitoring circuitry 210, the microcontroller unit (MCU) 216, etc.). As an example, the autonomous vehicle sensors 212 can send sensor data to the switch(es) 214. The switch(es) 214 can facilitate the communication of the sensor data to each of the functional circuits. As another example, functional circuitry 202 can generate an output and send the output to switch(es) 214. Switch(es) 214 can facilitate (e.g., transmit, communicate, route, etc.) the output to the monitoring circuitry 210.

The autonomous vehicle computing system can include monitoring circuitry 210 including one or more monitoring circuits. A monitoring circuit can, in some implementations, include any and/or all of the hardware devices previously mentioned with regards to the functional circuits (e.g., 202, 206, etc.). As an example, monitoring circuitry 210 can include a PCB, a CPU, memory, and storage device(s). Further, in some implementations, the components of monitoring circuitry 210 can be assured to a specified functional safety standard (e.g., ASIL-D of ISO 26262, etc.). More particularly, monitoring circuitry 210 itself can be assured, and therefore can assure the functionality of outputs of the functional circuits and/or assure the proper operation of the functional circuits themselves.

In some implementations, monitoring circuitry 210, and/or various components of monitoring circuitry 210, can be virtualized (e.g., as a virtual machine, virtual device, container, etc.). As an example, monitoring circuitry 210 can include virtualized monitoring circuitry. It should be noted that the functional safety certification of physical monitoring circuitry can, in some implementations, extend to virtualized monitoring circuitry executed by the physical circuitry. As an example, an ASIL-D certified physical monitoring circuitry can execute one or more virtual monitoring circuits that are also ASIL-D certified.

The monitoring circuitry 210 can, in some implementations, monitor the internal processing operations of one or more of the functional circuits (e.g., 206, 208, etc.) to assure the proper operation of the functional circuits. More particularly, the monitoring circuitry 210 can evaluate various aspects of the functional circuits while the circuits performs processing operations. As an example, the monitoring circuitry 210 may evaluate aspects of a CPU of functional circuitry 202 (e.g., clock error reporting, voltage monitoring, error collection, clock frequency monitoring, etc.). As another example, the monitoring circuitry 210 may evaluate aspects of two GPUs of the functional circuitry 204 (e.g., clock error reporting, voltage monitoring, clock frequency monitoring, etc.). In some implementations, monitoring circuitry 210 can include a plurality of monitoring circuits, and the plurality of monitoring circuits can be used to monitor an equal number of functional circuits. In some alternative implementations, as depicted, a fewer number of monitoring circuitries (e.g., the single monitoring circuit 210) can be used to monitor a plurality of functional circuits (e.g., functional circuits 202, 204, 206, and 208).

In some implementations, the monitoring circuitry 210 of the autonomous vehicle computing system 200 can be used to determine a difference between outputs of the functional circuits (e.g., 206, 208, etc.). More particularly, monitoring circuitry 210 can generate comparative data associated with one or more differences between the outputs of the functional circuits (e.g., 202, 204, etc.). As an example, first output data from functional circuitry 202 may indicate a first output describing a first trajectory of an object external to the autonomous vehicle while second output data from functional circuitry 204 may indicate a second trajectory of the object. If the first trajectory and the second trajectory are within a certain degree of similarity, the comparative data can indicate that the functionality of both outputs is assured.

In some implementations, generating the comparative data can include detecting a fault within functional circuitry of the autonomous vehicle computing system 200. More particularly, by generating the comparative data, the monitoring circuitry 210 can detect a fault within one or more of the associated functional circuits being compared. A fault can be detected based on a certain degree of difference between outputs and/or an inherent aspect of an output (e.g., an impossible prediction, incompatible output, etc.). As an example, a first output may include a detection of an object external to the autonomous vehicle while a second output may not include a detection of the object in question. By generating the comparative data, the monitoring circuitry 210 can detect a fault within the second functional circuit associated with the failure to recognize the object external to the autonomous vehicle. For instance, a fault can be detected based on a difference between outputs that satisfies a difference threshold.

The autonomous vehicle computing system can include a microcontroller unit (MCU) 216 in some examples. The MCU 216 can be or otherwise include an interface with control systems and/or mechanisms of the autonomous vehicle. In some implementations, the MCU 216 can serve as an interface to utilize outputs of the functional circuits (e.g., 204, 206, etc.) to control the autonomous vehicle. As an example, the MCU 216 may receive an output from functional circuitry 208 (e.g., a motion plan, etc.). Based on the output, the MCU 216 can control the autonomous vehicle (e.g., adjust acceleration, increase engine power, implement steering instructions, etc.). In some implementations, the MCU 216 can serve as an intermediary between driving systems of the autonomous vehicle and the autonomous vehicle computing system 200. As an example, the MCU 216 can receive an output from functional circuitry 208 (e.g., a motion plan, etc.). Based on the output, the MCU 216 can generate instructions for electronic systems in the vehicle (e.g., send commands to a steering system, an engine system, etc.). In some implementations, the MCU 216 can oversee the operation and/or functionality of the autonomous vehicle computing system 200. As an example, the MCU 216 can receive prediction data from functional circuitry 208. In response, the MCU 216 can instruct the autonomous vehicle computing system 200 to generate motion planning data based at least in part on the functional circuitry. In such fashion, the MCU 216 can be used to implement and/or utilize any output of the functional circuits while also controlling the operations and/or functionality of the functional circuits.

Figure 3:
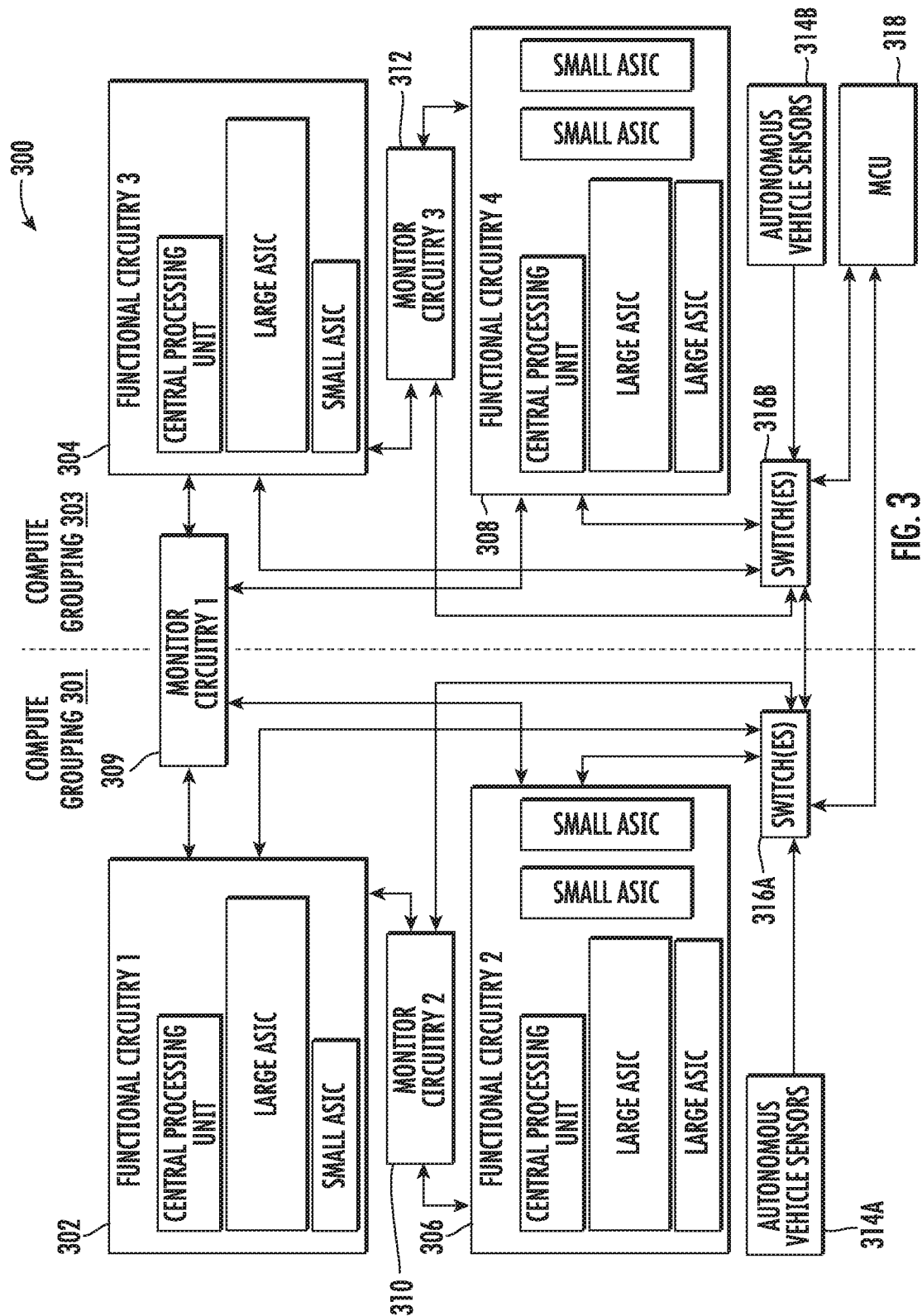
FIG. 3 depicts an example autonomous vehicle computing system including a bifurcated autonomous vehicle compute architecture according to example embodiments of the present disclosure.

FIG. 3 depicts an example autonomous vehicle computing system 300 including a bifurcated autonomous vehicle computer architecture according to example embodiments of the present disclosure. It should be noted that the various components of autonomous vehicle computing system (e.g., functional circuits 302-308, monitoring circuitry 310-312, switch(es) 316A/B, MCU 318, etc.) can be and/or otherwise operate as described in FIG. 2. As an example, the functional circuitry 302 can utilize the same components as the functional circuitry 202 of FIG. 2.

The bifurcated compute architecture of autonomous vehicle computing system 300 can include two "groups" of functional and monitoring circuitry configured to act independently (e.g., groupings 301 and 303). More particularly, a compute grouping can include monitor circuitry 2 and 3 (e.g., 310, 312) communicatively coupled to respective functional circuitry (e.g., 302-308) in each "group." Additionally, the bifurcated compute architecture can include a main monitor circuitry 309 that can monitor functional circuits across both compute groups of the bifurcated architecture. Further, a switch (e.g., 316A, 316B) can communicatively couple components of each "group" independently. Both "groups" can receive sensor information from autonomous vehicle sensors 314 and send data to microcontroller unit (MCU) 318. In such fashion, the compute architecture provides redundancy in case of hardware failure in the autonomous vehicle computing system.

As an example, compute grouping 301 can include a switch 316A. Switch 316A can receive sensor data from autonomous vehicle sensors 314A. Alternatively, switch(es) 316B can receive sensor data from autonomous vehicle sensors 314B. Switch 316A can transmit the sensor data to both functional circuitry 302 and functional circuitry 306. Both functional circuits can process the sensor data to generate an output (e.g., state data, prediction data, etc.). The outputs of both functional circuits can be sent to the monitoring circuitry 310. Monitoring circuitry 310 can process both outputs to evaluate a difference between the outputs, therefore providing assurance for the outputs. The monitoring circuitry 310 can send data (e.g., one or more of the outputs, the assurance status of the outputs, an indication of no assurance, etc.) to the switch 316A, which can subsequently send the data from the monitoring circuitry 310 to the MCU 318. As depicted, the compute grouping 301 can perform operations entirely independently from the compute resources of compute grouping 303. Thus, if any component of compute grouping 303 was to fail (e.g., overheating, crashing, etc.) the compute grouping 301 can be utilized as a redundant system to perform essential operations and ensure the proper operation of the autonomous vehicle computing system. For example, if switch(es) 316A were to stop receiving sensor information from autonomous vehicle sensors 314A, switch(es) 316B can receive sensor data from autonomous vehicle sensors 314B and transmit the sensor data to the switch(es) 316A (e.g., via the transmission lines as depicted).

It should be noted that the compute groupings depicted in FIG. 3 (e.g., compute groupings 301 and 303) are merely depicted to demonstrate the functionality of the autonomous vehicle computing system 300. More particularly, the division of components (e.g., functional circuitry, monitoring circuitry, etc.) amongst the groupings is depicted arbitrarily, and such components can be allocated in any other manner. Further, the compute groupings, as depicted do not include autonomous vehicle sensors 314 and microcontroller unit 318. As an example, the compute grouping 301 can include functional circuits 301 and 304, monitoring circuitry 310, and switch 316B. In some implementations, the groupings of components can be performed dynamically by the autonomous vehicle computing system 300 (e.g., by the microcontroller unit 318, etc.). As an example, the functional circuitry 306 can be dynamically grouped with compute grouping 303, leaving compute grouping 301 with only functional circuitry 302.

Further, in some implementations, components can remain "ungrouped" while still providing redundancies in the case of component failure. As an example, each of the functional circuits (e.g., 302, 304, 306, etc.) can be communicatively coupled to each of the switches (e.g., 316A/B) and each of the monitor circuits (e.g., 310 and 312). Alternatively, or additionally, the monitor circuitry 309 can provide monitoring functionality to each of the functional circuits regardless of compute group bifurcation. In such fashion, each of the functional circuits can operate independently of each other functional circuit to provide redundancies in case of hardware failure. As an example, even if functional circuits 302-306, monitoring circuitry 310, and switch 316A all experience hardware failure, functional circuitry 308 and monitor circuitry 312/309 can still provide the autonomous vehicle computing system the capacity to provide outputs for the autonomous vehicle (e.g., emergency outputs configured to safely stop the vehicle, etc.).

Figure 4:
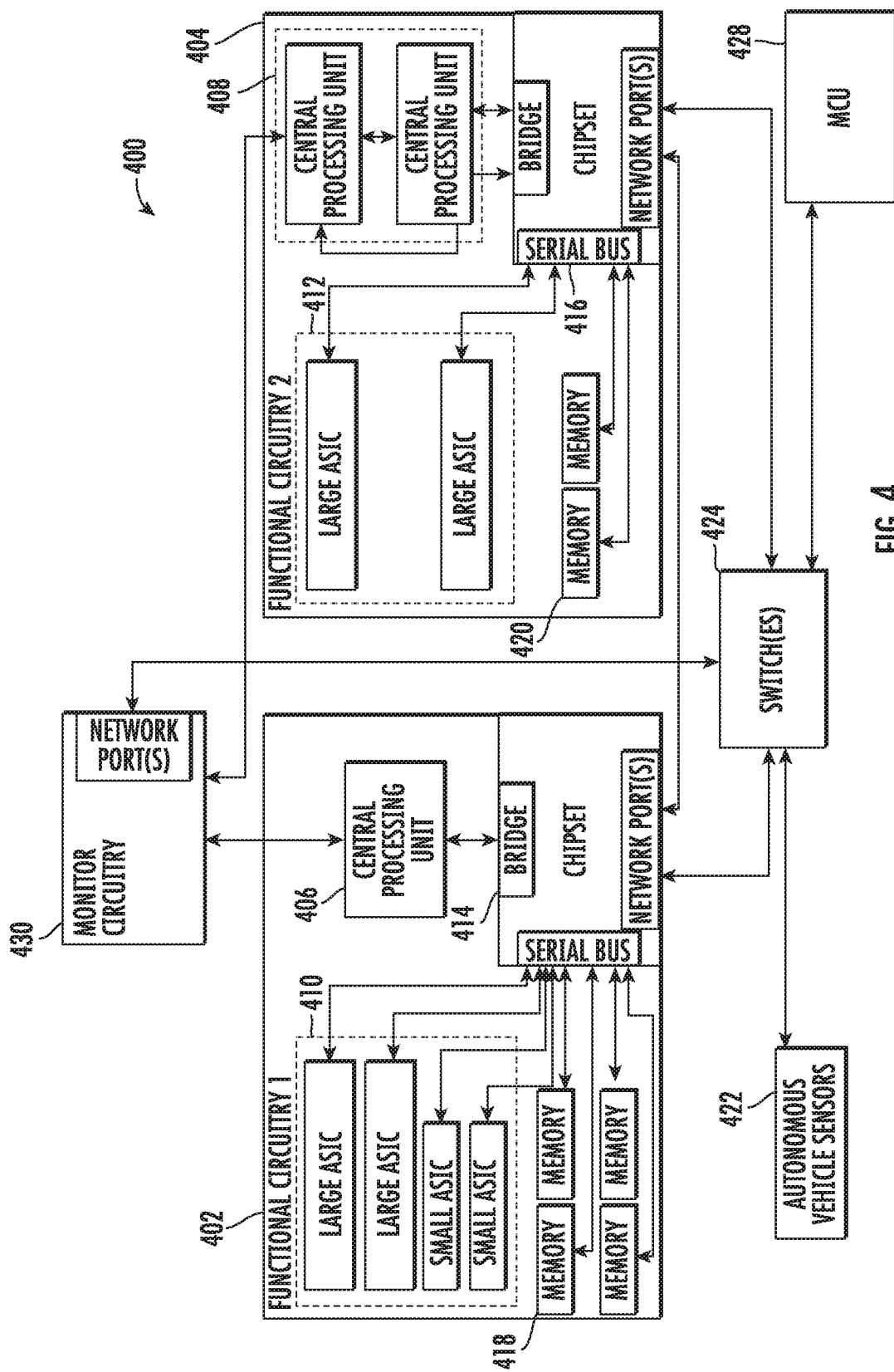
FIG. 4 depicts an example autonomous vehicle computing system including functional circuitry and monitoring circuitry according to example embodiments of the present disclosure.

FIG. 4 depicts an example autonomous vehicle computing system including functional circuitry and monitoring circuitry according to example embodiments of the present disclosure. More particularly, autonomous vehicle computing system 400 includes two functional circuits (e.g., 402 and 404). Functional circuitry 402 can include a chipset 414. Chipset 414 (e.g., a motherboard, printed circuit board, one or more integrated circuits, etc.) can house and/or facilitate communication between components of functional circuitry 402. As an example, functional circuitry 402 can include memory 418 (e.g., random access memory (RAM), storage drives, NVM storage, flash memory, NAND memory, etc.). Memory 418 can be communicatively connected to chipset 414 (e.g., through a RAM slot, serial bus interface, SATA connection, NVM or NVM express connection, etc.). As another example, central processing unit 408 can be communicatively connected to chipset 414 (e.g., through a CPU socket, a bridge, front-side bus, etc.). As yet another example, the ASICs 410 (e.g., graphics processing unit(s) (GPUs), accelerators, etc.) can be communicatively connected to chipset 414 (e.g., through a PCI express slot, etc.).

As depicted, the functional circuitry 404 can utilize different hardware resources than the functional circuitry 402. As an example, the chipset 404, in some implementations, can be a chipset architecture that provides support for two CPUs (e.g., CPUs 408). As another example, functional circuitry 404 can utilize fewer hardware components than functional circuitry 402. For example, functional circuitry 404, as depicted, utilizes fewer ASICs 412 and memory 420. In some implementations, the processing frequency of the functional circuits (e.g., 402 and 404) can be based in part on the processing capacity of the functional circuits (e.g., a type of component(s), a quantity of component(s), etc.). As an example, the functional circuitry 404 may generate one output for every two outputs generated by functional circuitry 402. As another example, in some circumstances the functional circuitry 402 may generate outputs at the highest frequency possible for functional circuitry 404.

The chipset 406 of functional circuitry 404 can be communicatively connected to the chipset of functional circuitry 402. In some implementations, the functional circuitries can communicate (e.g., transmit and receive data, etc.) without utilizing an intermediary component (e.g., switch(es) 424, etc.). In such fashion, the functional circuits can provide a communication redundancy in the case of hardware failure. As an example, each of the one or more switches 424 can fail. In response, the functional circuits 402 and 404 can communicate directly with each other using the network ports (e.g., ethernet ports, wireless access hardware, SATA connections, etc.) of their respective chipsets (e.g., 414 and 416). In some implementations, the chipsets can communicate directly with the MCU 428 and the autonomous vehicle sensors 422 of the autonomous vehicle computing system. Communication can be directly facilitated between the functional circuits 402 and 404 and the autonomous vehicle sensors 422 and the MCU 428.

The functional circuits 402 and 404 can be communicatively coupled to the monitor processing circuitry 430. In some implementations, the chipsets (e.g., 414 and 416) of the functional circuits can communicate with the monitor processing circuitry 430 directly (e.g., through network ports, etc.) and/or through the switch(es) 424.

In some implementations, the monitor processing circuitry can monitor the operations of CPUs 406 and 408 of the functional circuits. More particularly, the monitor processing circuitry 430 can evaluate various aspects of the CPUs 406 and 412 while the CPUs perform processing operations. As an example, the monitoring circuitry 430 may evaluate aspects of the CPU 406 while operating (e.g., clock error reporting, voltage monitoring, error collection, clock frequency monitoring, etc.). As another example, the monitoring circuitry 430 may evaluate aspects of ASICS 412 the functional circuitry 404 (e.g., clock error reporting, voltage monitoring, clock frequency monitoring, etc.).

Figure 5:
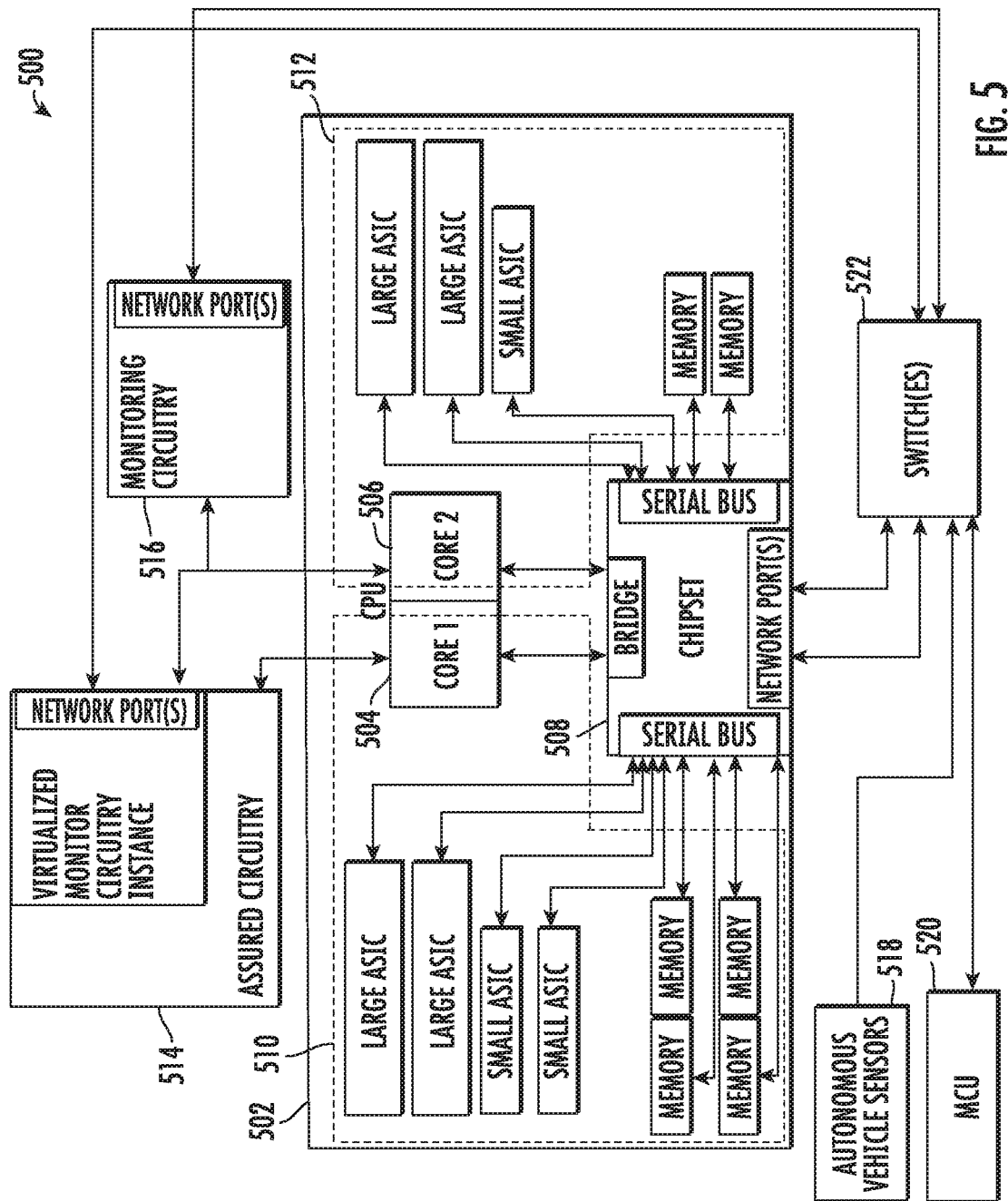
FIG. 5 depicts an example autonomous vehicle computing system including multicore functional circuitry and monitoring circuitry according to example embodiments of the present disclosure.

FIG. 5 depicts an example autonomous vehicle computing system 500 including multicore functional circuitry and monitoring circuitry according to example embodiments of the present disclosure. The autonomous vehicle computing system 500 includes functional circuits 502. Functional circuits 502 can include first functional circuitry 510 and second functional circuitry 512. As depicted, the functional circuits of functional circuits 502 can share hardware components. More particularly, first functional circuitry 510 and second functional circuitry 512 can utilize a shared chipset and cores (e.g., cores 504 and 506) on a central processing unit.

Functional circuitry 510 can include core 504 of a central processing unit (CPU). It should be noted that although functional circuitry 510 only shares one core of the CPU, the functional circuitry 510 could utilize any number of cores of a CPU (e.g., 8 cores of a 16 core CPU, 32 cores of a 48 core CPU, etc.). The functional circuitry 510 can include the chipset 508 (e.g., a printed circuit board (PCB), motherboard, etc.). In some implementations, the chipset 508 can be a dual-CPU motherboard (e.g., a motherboard with two CPU sockets, etc.). In such fashion, hardware resources connectively coupled to the chipset 508 (e.g., memory, ASICs, etc.) can be allocated to functional circuits 510 and 512, while both functional circuits can share communication resources of the chipset (e.g., network ports, bridge(s), serial bus(es), etc.). As an example, both functional circuits 510 and 512 can communicate with autonomous vehicle sensors 518, monitor processing circuits 514 and 516, and the MCU 520 through the network port(s) of the chipset 508 and the switch(es) 522.

In some implementations, the hardware components of each functional circuitry (e.g., 510 and 512) can be dynamically allocated. As an example, functional circuit 510 may include two "large" ASICs and two "small" ASICs. Based on an event occurrence (e.g., a certain type of requested processing operation, a hardware failure, etc.) one of the "large" ASICs can be allocated from the functional circuitry 510 to the functional circuitry 512. In such fashion, the autonomous vehicle computing system can easily allocate hardware components between functional circuits 502.

The functional circuits 502 can be connected to the monitor circuits 514 and 516. Monitor circuitry 514, as depicted, can be a virtualized monitoring circuitry instance. The virtualized monitoring circuitry instance can be executed by assured circuitry (e.g., assured hardware components, etc.). It should be noted that the functional safety certification of the assured circuitry can, in some implementations, extend to the virtualized monitoring circuitry instance executed by the assured circuitry. As an example, an ASIL-D certified assured monitoring circuitry can execute one or more virtual monitoring circuitry instances that are also ASIL-D certified. The assured circuitry can be one or more hardware components that are certified by a safety specification (e.g., an ASIL-D certification, etc.). The certification can specify that the hardware is manufactured using certain architecture(s), process(es), standard(s), etc.

It should be noted that although the monitoring circuitry 516 is depicted as a hardware monitoring circuit, the monitoring circuitry 516 can also be a second virtualized monitoring circuitry instance (e.g., executed by the assured circuitry). Each CPU core of the functional circuits 502 (e.g., 504 and 506) can be respectively monitored by the monitor circuits 514 and 516. Virtualized monitoring circuitry instance 514 can receive outputs from cores 504 and 506 and evaluate a difference between each of the outputs to provide output assurance. In such fashion, multiple monitoring circuits (e.g., 514 and 516) can provide output assurance and operations monitoring for multiple cores of a single CPU.

Figure 6:
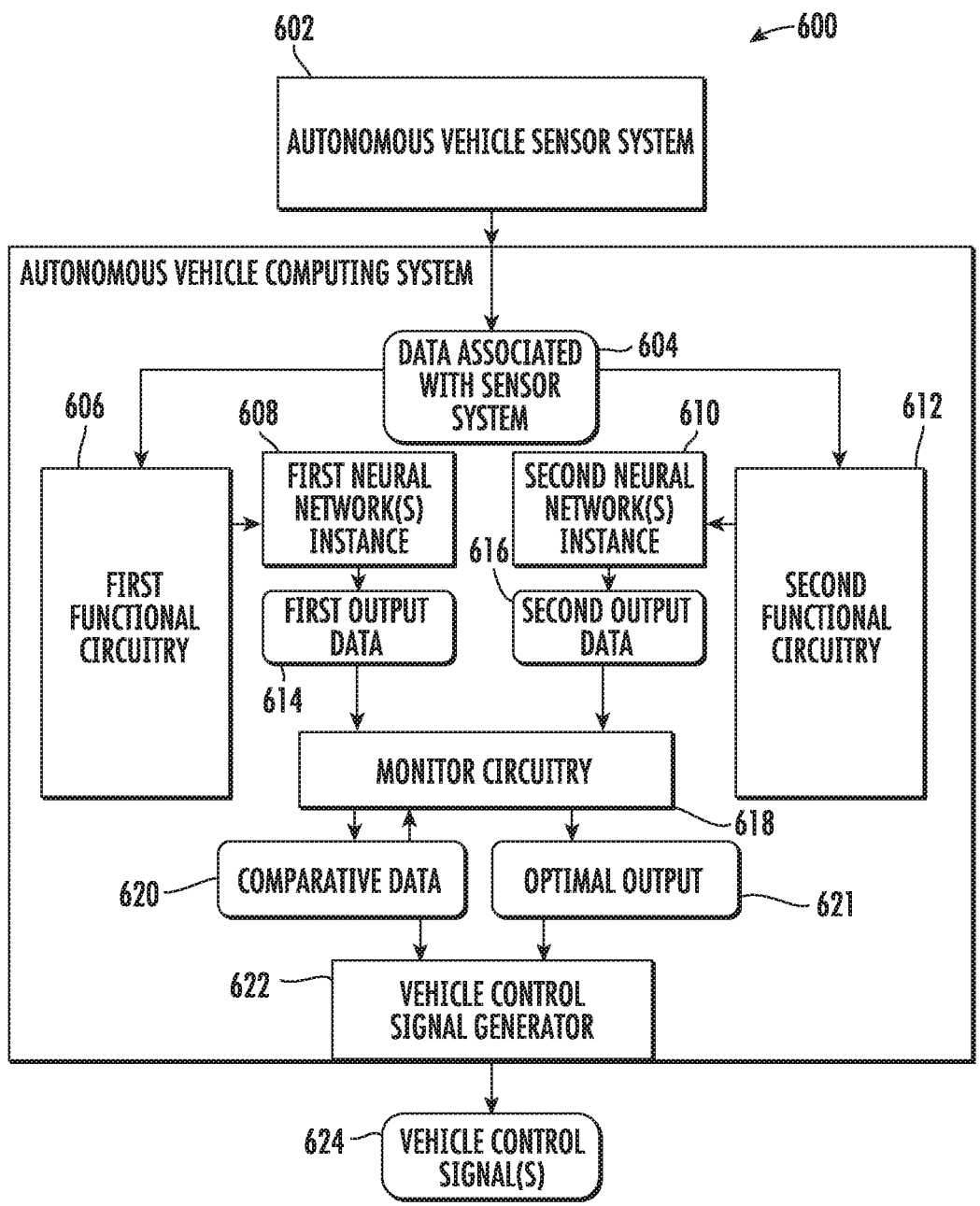
FIG. 6 is a block diagram depicting a process for generating autonomous vehicle functional outputs using functional circuitry and generating comparative data using monitoring circuitry according to example embodiments of the present disclosure.

FIG. 6 is a block diagram depicting a process 600 for generating autonomous vehicle functional outputs using functional circuitry and checking output consistency using monitoring circuitry according to example embodiments of the present disclosure. The autonomous vehicle computing system can receive sensor data (e.g., data associated with the sensor system 604) from an autonomous vehicle sensor system 602. It should be noted that although the data depicted is sensor data 604, the data received by the autonomous vehicle computing system can, in some implementations, be any other sort of data that can be processed to generate an output. As an example, the data obtained by the autonomous vehicle computing system can be or otherwise include a previous output of the autonomous vehicle computing system.

The data associated with the sensor system 604 can be received by the first functional circuitry 606 and the second functional circuitry 612. The first functional circuitry 606 can utilize a first neural network(s) instance 608 to generate first output data 614. The second functional circuitry can utilize a second neural network(s) instance 610 to generate second output data 616. Both the first output data 614 and the second output data 616 can be associated with the same autonomous function of the vehicle (e.g., motion planning, object recognition, object classification, pose calculation(s), etc.). As an example, both the first output data 614 and the second output data 616 can be motion plans for the autonomous vehicle. As another example, both the first output data 614 and the second output data 616 can be perception data indicating or associated with a moving object in an environment external to the autonomous vehicle. As yet another example, the output(s) can be or otherwise include a world state describing one or more aspects of the environment external to the autonomous vehicle. The associated autonomous function of the vehicle can, in some implementations, be any sort of processing task and/or operation associated with the autonomous functionality of the vehicle. In such fashion, the functional circuits 606 and 612 can generate outputs in a lockstep manner to assure proper output functionality and also provide multiple redundancies in the case of system failures.

In some implementations, the neural network instances 608 and 610 can be instances of the same neural network(s). As an example, both the first functional circuitry 606 and the second functional circuitry 612 may respectively utilize first and second instances of the same machine-learned model (e.g., a neural network(s), etc.) configured to perform the same function and to generate outputs. Alternatively, in some implementations, the first functional circuitry 606 and the second functional circuitry 612 can use instances of different neural network(s) to generate the first output data 614 and the second output data 616 from the data associated with the sensor system 604. As an example, the first functional circuitry 606 may utilize a first instance of a neural network 608 (e.g., a convolutional neural network, recurrent neural network, etc.) trained on a first set of training data, while the second functional circuitry 612 may utilize a second instance of a second neural network 610 trained on a second set of training data. Further, it should be noted that the utilization of neural network instances (e.g., 608 and 610) are merely for demonstration. The first and second functional circuits (e.g., 606 and 612) can, in some implementations, use any other sort of machine-learned non-deterministic model (e.g., support vector machine(s), decision tree(s), KNN classifier(s), etc.) or any sort of deterministic algorithm and/or machine-learned model. In such fashion, the autonomous vehicle computing system can utilize different algorithms and/or neural networks to generate and evaluate outputs associated with the same autonomous compute function.

It should be noted that the first output data 614 and the second output data 616 can, as depicted, be generated at the same rate by the functional circuits 606 and 612. However, in some implementations, functional circuits 606 and 612 can generate outputs at different rates. More particularly, first functional circuitry 606 can generate first output data at a first frequency while second functional circuitry 612 can generate second output data at a second frequency that is lower than the first frequency. As an example, the first functional circuitry 606 can generate five outputs of first output data 614 in the amount of time that the second functional circuitry 612 can generate one output of second output data 616. Output assurance can still occur if the output generated by the first functional circuitry 606 (e.g., first output data 614) is checked against the corresponding output from functional circuitry 612 when the second functional circuitry 612 completes processing (e.g., second output data 616). As such, FIG. 6, as depicted can depict any output generation frequency for either of the functional circuits. In some implementations, the difference in processing frequency between functional circuits can stem from a difference in the hardware resources or other compute capacity of the functional circuitry. As an example, the first functional circuitry 606 can include two CPUs and four GPUs while the second functional circuitry 612 includes one CPU and one GPU.

The monitoring circuitry 618 of the autonomous vehicle computing system can be used to determine a difference between the first output data 614 and second output data 616 of the functional circuits 606 and 612. More particularly, monitoring circuitry 618 can generate comparative data 620 associated with one or more differences between the first output data 614 and the second output data 616. As an example, first output data 614 may indicate a first output describing a first trajectory of an object external to the autonomous vehicle while second output data 616 may indicate a second trajectory of the object. If the first trajectory and the second trajectory are within a certain degree of similarity (e.g., a 5% variation in trajectory angle, a 10% difference in trajectory length, etc.), the comparative data 620 can indicate that the functionality of both outputs is assured.

As another example, first output data 614 may indicate a first output describing a first trajectory of an object external to the autonomous vehicle while second output data 616 may indicate a second trajectory of the object. Both trajectories can describe a trajectory that does not intersect the current trajectory of the autonomous vehicle. Even if the described trajectories of the outputs vary substantially (e.g., a 30% difference in trajectory angle, a 50% difference in trajectory angle, etc.), the comparative data 620 can still indicate that the functionality of both outputs is assured as neither trajectories intersect with the autonomous vehicle motion plan. Alternatively, in some implementations, the comparative data 620 may indicate that the functionality of both outputs is non-assured. As yet another example, the first output data 614 can describe a motion plan that navigates the vehicle through a right hand turn while the second output data 614 can describe a motion plan that navigates the vehicle straight through an intersection. Based on the substantial variance between the motion plan, the comparative data 620 can indicate that neither output (e.g., 614 or 616) is assured.

Although the first and second functional circuits can produce outputs at different frequencies, the monitoring circuitry 618 can compare the outputs (e.g., 614 and 616) to detect anomalies. As an example, the monitoring circuitry 618 can perform an evaluation and generate an output at the frequency of the slower functional circuitry in examples embodiments. For instance, the first functional circuitry 606 may generate four first output data 514 while the second functional circuitry 612 generates one second output data 616. The monitoring circuitry 618 can compare the first generated output 614 of the first functional circuitry 606 and the generated output 616 of the second functional circuitry 610. Although the first output may have already been utilized (e.g., sent to a microcontroller unit, etc.), the monitoring circuitry 618 can still perform a so-called "lazy" lockstep assurance (e.g., retroactively assurance of the output). Alternatively, in some implementations, the first output 614 can be held or stored alongside subsequent outputs of the first functional circuitry 606 while the second output 616 is generated, and the assurance of the two outputs (e.g., 614 and 616) can provide assurance for the subsequently held outputs. This technique can, in some implementations, be utilized in situations where the assurance of every single output is less "important" (e.g., the short term consequences for non-assurance of an output are relatively minor or nonexistent). In such fashion, functional circuitry with less compute capacity (e.g., a functional circuitry with a slower frequency) can be used to assure the functionality of the outputs of a more computationally capable functional circuitry.

In some implementations, generating the comparative data 620 can include detecting a fault within functional circuits (e.g., 606 and 612) of the autonomous vehicle computing system. More particularly, by generating the comparative data 620, the monitoring circuitry 618 can detect a fault within one or more of the associated functional circuits 606 and 612 being compared. A fault can be detected based on a certain degree of difference between output data 614 and 616 and/or an inherent aspect of an output (e.g., an impossible prediction, incompatible output, etc.). As an example, first output data 614 may include a detection of an object external to the autonomous vehicle while second output 616 may not include a detection of the object in question. By generating the comparative data 620, the monitoring circuitry 618 can detect a fault within the second functional circuitry 612 associated with the failure to recognize the object external to the autonomous vehicle. For instance, a fault can be detected based on a difference between outputs that satisfy a difference threshold.

The autonomous vehicle computing system can generate one or more motion plans based at least in part on the comparative data 620. In some implementations, generating the one or more motion plans can include, if either of the first output data 614 or the second output data 616 are motion plans or otherwise include motion plans, selecting one of the outputs. As an example, both the first output data 614 and the second output data 616 may be motion plans. To generate the motion plan, the autonomous vehicle computing system can select either of the outputs as the motion plan. In some implementations, the outputs from the functional circuits 606 and 612 can be data that the motion plan can be based on (e.g., a pose, vehicle trajectory, object recognition, prediction, perception, etc.). As an example, the outputs (e.g., 614 and 616) may identify a stopped vehicle in front of the autonomous vehicle. The motion plan can be generated such that the autonomous vehicle avoids the stopped vehicle. As another example, the outputs (e.g., 614 and 616) may identify a predicted object trajectory that intersects the path autonomous vehicle. The motion plan can be generated such that the autonomous vehicle moves out of the predicted object trajectory.

Alternatively, or additionally in some implementations, the monitoring circuitry 618 can determine an optimal output 621. The optimal output can be based at least in part on the comparative data 620. More particularly, based on the comparative data 620, the monitoring circuitry 618 can select one of the first output data 614 and the second output data 616 as an optimal output (e.g., based on a detected fault, inconsistency, optimal solution, etc.). In other examples, an optimal output 621 can be selected based on an evaluation of the first output data 614 and the second output data 616. For instance, a probability assessment associated with the outputs (e.g., 614 and 616) can be performed by the monitoring circuitry 618 and used to select an output as an optimal output.

In some implementations, a combination of the first output data 614 and the second output data 616 can be used by the monitoring circuitry to determine an optimal output 621. More particularly, the comparative data 620 can describe an optimal combination of the first output data 614 and the second output data 616. As an example, the first output data 614 may describe the trajectory of an object having an angle of 64 degrees. The second output data 616 may describe the trajectory of the object having an angle of 66 degrees. The comparative data 620 can describe a substantially low difference between both outputs, and therefore provide assurance for both. The comparative data 620 can further describe that an optimal combination of the two outputs can be an average of the two outputs (e.g., 65 degrees). In such fashion, the monitoring circuitry 618 can both assure the first output data 614 and the second output data 616 while also determining an optimal output 621 for input to the vehicle control signal generator 622.

The autonomous vehicle computing system can generate one or more vehicle control signals 624 using a vehicle control signal generator 622. In some implementations, the vehicle control signal generator 622 can be included in the autonomous vehicle computing system. Alternatively, in some implementations, the vehicle control signal generator 622 can be located externally from the autonomous vehicle computing system (e.g., an adjacent and/or associated computing system such as a vehicle control computing system, vehicle interface computing system, etc.), and can receive the comparative data 620 from the autonomous vehicle computing system. The vehicle control signals 624 can be based at least in part on the comparative data 620, the optimal output 621, and/or one or more motion plans. In some implementations, the autonomous vehicle computing system can use one or more of the functional circuits (e.g., 606 and 612) to generate the vehicle control signals 624. Additionally, or alternatively, in some implementations the autonomous vehicle computing system can use a processor and/or computing device separate from the functional circuits to generate the vehicle control signals (e.g., a vehicle control system).

The vehicle control signals 624 can be based at least in part on the comparative data 620 associated with the difference(s) between the first output data 614 and the second output data 616. As an example, both the first and second output data (e.g., 614 and 616) can be substantially similar or identical motion plans for the autonomous vehicle. Vehicle control signals 624 can be generated that control the vehicle to operate according to one of the motion plans. As another example, the first and second output data (e.g., 614 and 616) can be predictions for the trajectory of an object external to the autonomous vehicle. Vehicle control signal(s) 624 can be generated to control the vehicle to avoid the predicted trajectory of the object.

In some implementations, the vehicle control signals 624 can be based at least in part on the optimal output 621. As an example, the optimal output 621 can be an optimal motion plan as determined by the monitoring circuitry 618 based at least in part on the comparative data 620. Vehicle control signals 624 can be generated that control the vehicle to operate according to the optimal output 621.

In some implementations, the vehicle control signals 622 can be emergency control signals generated if the comparative data 620 indicates a fault in functional circuitry 606 and/or functional circuitry 612. The emergency control signals can be configured to safely stop the autonomous vehicle (e.g., slow the vehicle, stop the vehicle, navigate the vehicle to a safe stopping location, etc.). As an example, the monitoring circuitry 618 can detect a fault in the second functional circuitry 612 while generating comparative data 620 between first and second outputs (e.g., 614 and 616). The non-faulting functional circuitry (e.g., the first functional circuitry 606) can be used to generate the emergency control signals to safely stop the vehicle.

Figure 7:
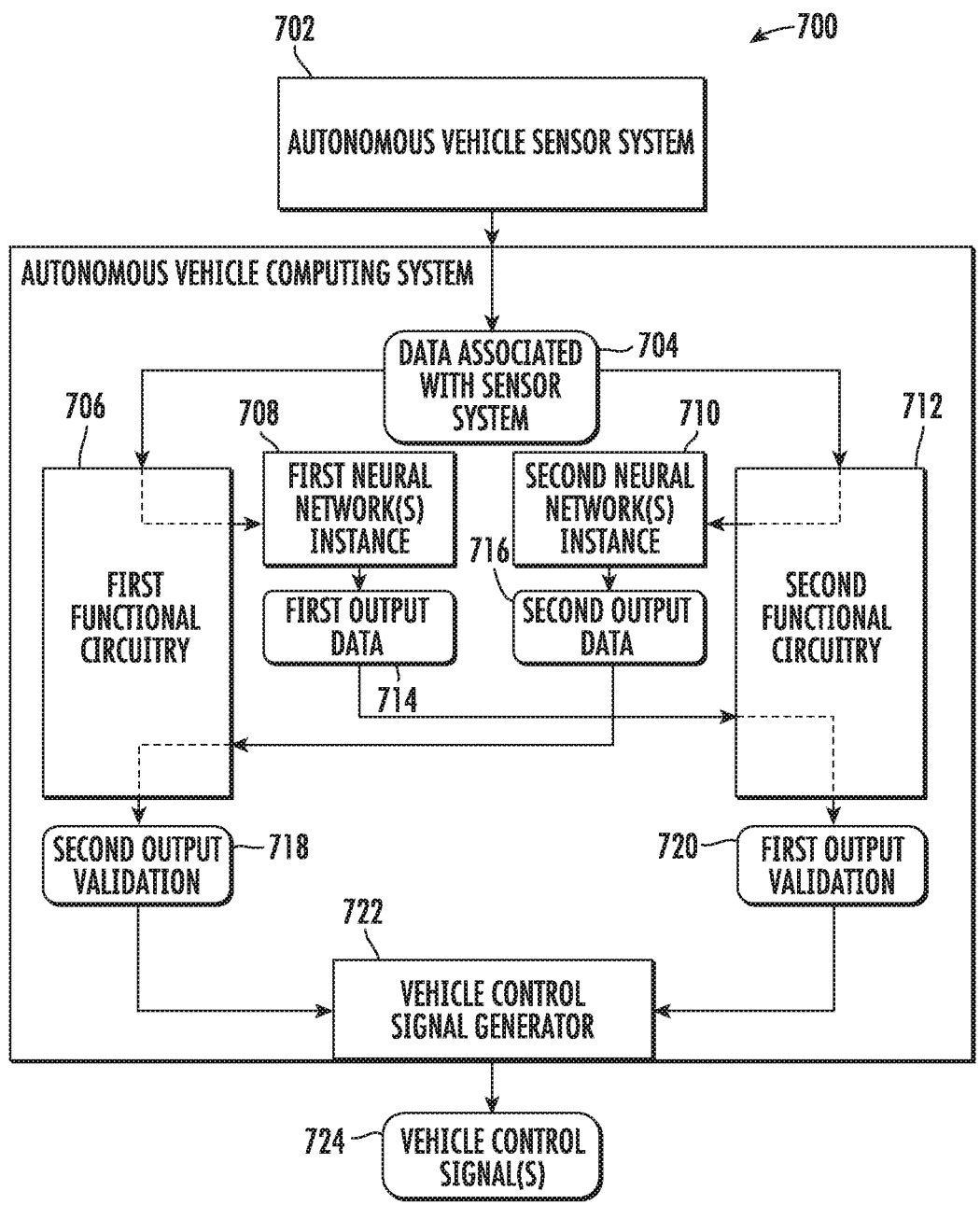
FIG. 7 is a block diagram depicting a process for generating and monitoring autonomous vehicle functional outputs using functional circuitry according to example embodiments of the present disclosure.

FIG. 7 is a block diagram depicting a process 700 for generating and monitoring autonomous vehicle functional outputs using functional circuitry according to example embodiments of the present disclosure. The autonomous vehicle computing system can receive sensor data (e.g., data associated with the sensor system 704) from an autonomous vehicle sensor system 702. It should be noted that although the data depicted is sensor data 704, the data received by the autonomous vehicle computing system can, in some implementations, be any other sort of data that can be processed to generate an output. As an example, the data obtained by the autonomous vehicle computing system can be or otherwise include a previous output of the autonomous vehicle computing system.

The data associated with the sensor system 704 can be received by the first functional circuitry 706 and the second functional circuitry 712. The first functional circuitry 706 can utilize a first neural network(s) instance 708 to generate first output data 714. The second functional circuitry can utilize a second neural network(s) instance 710 to generate second output data 716. Both the first output data 714 and the second output data 716 can be associated with the same autonomous function of the vehicle (e.g., motion planning, object recognition, object classification, pose calculation(s), etc.). As an example, both the first output data 714 and the second output data 716 can be motion plans for the autonomous vehicle. As another example, both the first output data 714 and the second output data 716 can be perception data indicating or associated with a moving object in an environment external to the autonomous vehicle. As yet another example, the output(s) can be or otherwise include a world state describing one or more aspects of the environment external to the autonomous vehicle. The associated autonomous function of the vehicle can, in some implementations, be any sort of processing task and/or operation associated with the autonomous functionality of the vehicle. In such fashion, the functional circuits 706 and 712 can generate outputs in a "lockstep" manner to assure proper output functionality and also provide multiple redundancies in the case of system failures.

In some implementations, the neural network instances 708 and 710 can be instances of the same neural network(s). As an example, both the first functional circuitry 706 and the second functional circuitry 712 may respectively utilize first and second instances of the same machine-learned model (e.g., a neural network(s), etc.) configured to perform the same function and to generate outputs. Alternatively, in some implementations, the first functional circuitry 706 and the second functional circuitry 712 can use instances of different neural network(s) to generate the first output data 714 and the second output data 616 from the data associated with the sensor system 704. As an example, the first functional circuitry 706 may utilize a first instance of a neural network 708 (e.g., a convolutional neural network, recurrent neural network, etc.) trained on a first set of training data, while the second functional circuitry 712 may utilize a second instance of a second neural network 710 trained on a second set of training data. Further, it should be noted that the utilization of neural network instances (e.g., 708 and 710) are merely for demonstration. The first and second functional circuits (e.g., 706 and 712) can, in some implementations, use any other sort of machine-learned non-deterministic model (e.g., support vector machine(s), decision tree(s), KNN classifier(s), etc.) or any sort of deterministic algorithm and/or machine-learned model. In such fashion, the autonomous vehicle computing system can utilize different algorithms and/or neural networks to generate and evaluate outputs associated with the same autonomous compute function. The first and second functional circuits may additionally or alternatively include or otherwise non-machine-learned functions.

The first functional circuitry 706 can be used (e.g., by the autonomous vehicle computing system, by a monitoring circuitry, etc.) to generate a validation of the second output 718. More particularly, the first functional circuitry 706 can generate the second output validation 718 by validating the second output data 716 against a world state associated with the first functional circuitry 706. The world state can describe a perception of the environment external to the autonomous vehicle. Further, in some implementations, the world state can be associated with the first neural network(s) instance 708. The second output validation 718 can be or otherwise include an "evaluation" of the results of the second output data 716. As an example, the second output data 716 can describe a trajectory of an object external to the autonomous vehicle. The first functional circuitry can utilize the second output data 716 in conjunction with the first neural network instance 708 and the data associated with the sensor system 704 to confirm that the second output is valid and generate second output validation 718.

Similarly, the second functional circuitry 712 can be used (e.g., by the autonomous vehicle computing system, by a monitoring circuitry, etc.) to generate a validation of the first output 714. More particularly, the second functional circuitry 712 can generate the first output validation 720 by validating the first output data 714 against a world state associated with the first functional circuitry 706. The world state can describe a perception of the environment external to the autonomous vehicle. Further, in some implementations, the world state can be associated with the second neural network(s) instance 710. In such fashion, functional circuits 706 and 712 can be used to cross-validate outputs and assure proper functionality of the outputs and the functional circuitry.

In some implementations, comparative data can be generated based on the first output validation 720 and the second output validation 718 (e.g., by monitoring circuitry, by the autonomous vehicle computing system, by the vehicle control signal generator 722, etc.). Alternatively, or additionally, in some implementations, the vehicle control signal generator 722 can receive the first and second output validations (e.g., 718 and 720), and based on the validations generate vehicle control signal(s) 724. In some implementations, the vehicle control signal generator 722 can be, include, or otherwise utilize monitoring circuitry to generate the vehicle control signals based on the second output validation and the first output validation. As an example, the vehicle control signal generator 722 can process the first and second output validations (e.g., 718 and 720) with a monitor processing circuitry to generate an optimal output. The optimal output can be an optimal output as described in FIG. 6. The vehicle control signal(s) 724 can be generated by the vehicle control signal generator 722 based at least in part on the optimal output.

The vehicle control signals 724 can be based at least in part on the comparative data 720. As an example, both the first and second output data (e.g., 714 and 716) can be substantially similar or identical motion plans for the autonomous vehicle. Vehicle control signals 724 can be generated that control the vehicle to operate according to one of the motion plans. As another example, the first and second output data (e.g., 714 and 716) can be predictions for the trajectory of an object external to the autonomous vehicle. Vehicle control signal(s) 724 can be generated to control the vehicle to avoid the predicted trajectory of the object.

In some implementations, the vehicle control signals 722 can be emergency control signals generated if the first output validation 820 and/or the second output validation 718 indicates a fault in functional circuitry 706 and/or functional circuitry 712. The emergency control signals can be configured to safely stop the autonomous vehicle (e.g., slow the vehicle, stop the vehicle, navigate the vehicle to a safe stopping location, etc.). As an example, the second output validation 718 can indicate a fault in the second functional circuitry 712. The non-faulting functional circuitry (e.g., the first functional circuitry 706) can be used to generate the emergency control signals to safely stop the vehicle.

Figure 8:
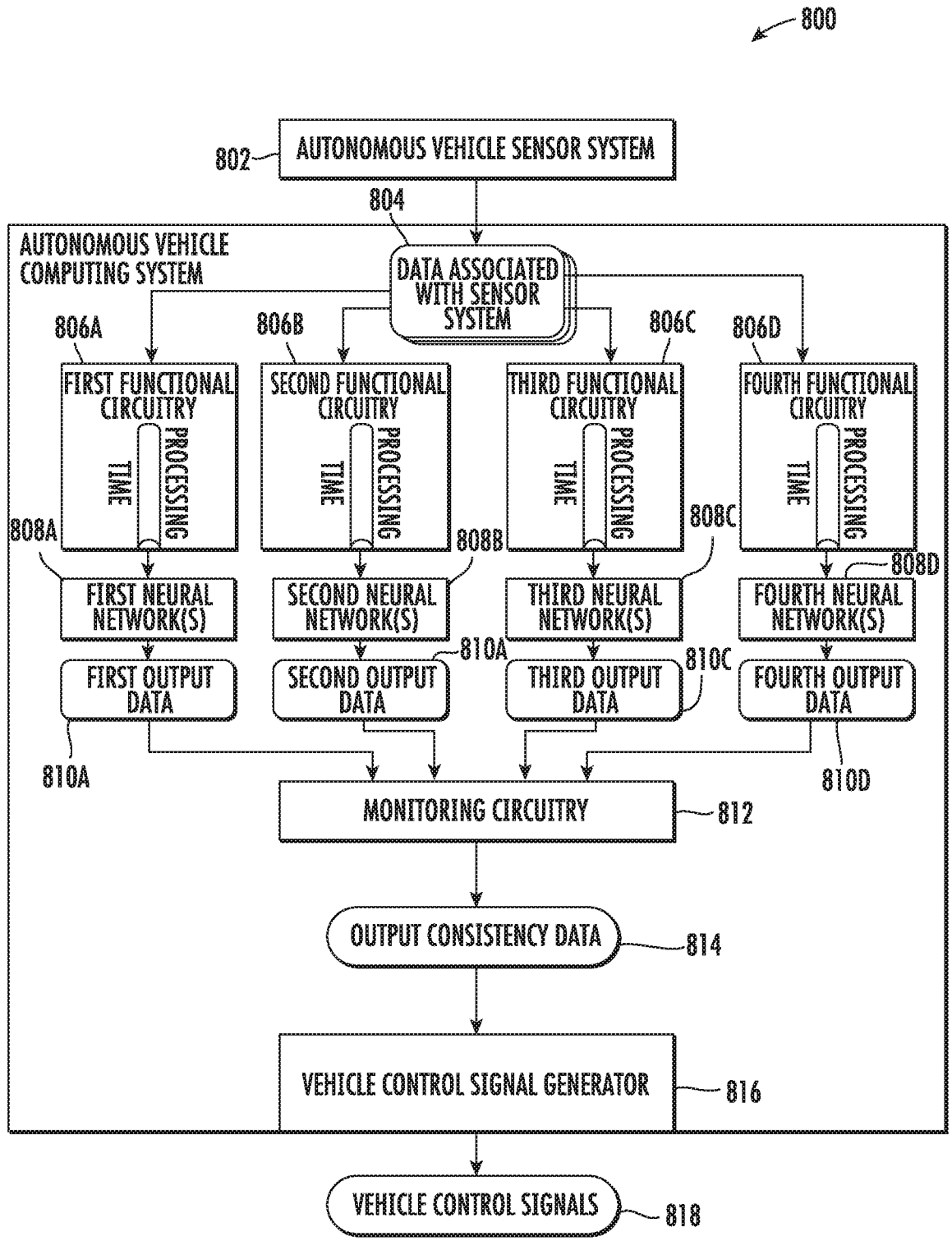
FIG. 8 is a block diagram depicting a process for providing a time-dependent output consistency across a plurality of functional circuits according to example embodiments of the present disclosure.

FIG. 8 is a block diagram depicting a process 800 for providing a time-dependent output consistency across a plurality of functional circuits according to example embodiments of the present disclosure. The autonomous vehicle computing system can receive sensor data (e.g., data associated with the sensor system 804) from an autonomous vehicle sensor system 802. It should be noted that although the data depicted is sensor data 804, the data received by the autonomous vehicle computing system can, in some implementations, be any other sort of data that can be processed to generate an output. As an example, the data obtained by the autonomous vehicle computing system can be or otherwise include a previous output of the autonomous vehicle computing system.

The data associated with the sensor system 804 can be received by each of a plurality of functional circuits (e.g., 806A-806D). More particularly, the plurality of functional circuits (e.g., 806A-806D) can be configured to obtain the data associated with the sensor system 804 (e.g., sensor data) asynchronously. The sensor data 804 can describe one or more aspects of an environment external to the autonomous vehicle at a current time. As an example, first functional circuitry 806A can obtain sensor data 804 depicting the environment at a first time, while second functional circuitry 806B can obtain sensor data 804 depicting the environment at a second time. As such, the sensor data 804 can differ based on the time in which the sensor data 804 was obtained.

Each of the functional circuits (e.g., 806A-806D) can use neural network(s) (e.g., neural network(s) 808A-808D) to generate respective output data (e.g., 810A-810D) over a time period (e.g., an amount of time required to process the input and generate an output). The respective outputs 810A-810D (e.g., a motion plan, perception, prediction, object trajectory, pose, etc.) can be based at least in part on the sensor data 804. As the time period represents the amount of time required for processing over all of the functional circuits 806A-806D, the time period can be variable and can vary based on the computational capacity of each functional circuit. As an example, the first functional circuitry 806A including four GPUs may generate the output over a smaller portion of the time period than second functional circuitry 806B with a single GPU. Further, even assuming that all functional circuits have identical computational capacity, the sequential and asynchronous input of sensor data 804 to each of the respective functional circuits 806A-806D can lead to a sequential and asynchronous generation of respective outputs 810A-810D. More particularly, the outputs 810A-810D can be generated in the same specified order as the inputs (e.g., sensor data 804). As the outputs 810A-810D are generated, the outputs 810A-810D can be sent to monitoring circuitry 812 (e.g., through the one or more communication switches, with a direct communication link from the functional circuits 806A-806D to the monitoring circuitry 812, etc.).

The functional circuits 806A-806D can, in some implementations, work asynchronously and in parallel. As an example, first functional circuitry 806A can obtain sensor data 804 and begin to generate the first output data 810A over the time period. While the first functional circuitry 806A generates the output, second functional circuitry 806B can obtain sensor data 804 and begin to generate the second output data 810B over the time period. The first functional circuitry 806A can finish generating the first output data 810A and the third functional circuitry 806C can obtain sensor data 804 while the second functional circuitry 806B is generating the second output data 810B over the time period. As such, each of the functional circuits 806A-806D can work in parallel on the inputs (e.g., sensor data 804, etc.) in the order they are received.

The monitoring circuitry 812 can be configured to evaluate the output data 810A-810D according to the specified order in which the outputs are received. The specified order in which the output data 810A-810D is received by the monitoring circuitry 812 can be the same order in which the sensor data 804 is obtained and the output data is generated. By evaluating the output data 810A-810D in the specified order, the monitoring circuitry 812 can determine output consistency data 814 that evaluates a consistency between the output data 810A-810D. More particularly, the monitoring circuitry 812 can detect variations between output data 810A-810D over time. One or more thresholds, for example, may be used to detect variations indicative of a potential fault or other error. It should be noted that the sensor data 814 obtained by each functional circuitry can be different (e.g., based on the time it was obtained, etc.) and therefore each of the output data 810A-810D should not necessarily be identical. Instead, the output consistency 814 can measure large variations in the outputs to determine if the outputs are sufficiently consistent in example embodiments.

In determining the output consistency 814, the monitoring circuitry 812 can, in some implementations, assign different weights to the output data 810A-810D based on the specified order. As an example, the monitoring circuitry 812 can weigh the consistency of later generated output data (e.g., fourth output data 810D) over earlier generated output data (e.g., first output data 810A). For example, if the monitoring circuitry 812 receives four outputs of output data (e.g., 810A-810D) where the first two outputs of the output data (e.g., 810A-810B) are not indicative of an object detection or recognition in an environment and the last two outputs of output data (e.g., 810C-810D) are indicative of an object detection or recognition in the environment, the monitoring circuitry 812 can identify a sufficient level of consistency between the results, as the consistency of the last two outputs (e.g., output data 810D) can be weighed more heavily as they are more temporally relevant than the first two outputs (e.g., output data 810A-810B). As such, the temporal recency of the outputs can be considered and utilized in the weighting of consistency between outputs by the monitoring circuitry 812.

The level of output consistency required (e.g., as specified by the output consistency data 814) can, in some implementations, be specified by a consistency threshold (e.g., a discrete value, etc.). As an example, the monitoring circuitry 812 may assign a percentage level of consistency to the results in output consistency data 814, which can fall above or below a predetermined consistency threshold. The consistency threshold can be determined by the autonomous vehicle computing system, and can dynamically vary based on one or more aspects of the autonomous vehicle's operation (e.g., previous faults, weather, environment, previously detected objects, etc.). As an example, if faults have already been detected in the computing system's operation, the consistency threshold may be raised to further assure the proper functionality of the autonomous vehicle computing system. As another example, if the weather in the environment external to the autonomous vehicle is poor (e.g., raining, fog, etc.), the consistency threshold may be raised to assure proper functionality.

Additionally, or alternatively, in some implementations, the monitoring circuitry 812 can weigh the consistency of various outputs based on the algorithm (e.g., deterministic algorithm, neural network, machine-learned model, etc.) used to generate the output. As an example, first functional circuitry 806A can use first neural network(s) 808A to generate the first output data 810A. First neural network(s) 808A may be or otherwise include a recently developed machine-learned model. The second, third, and fourth functional circuits 806B-806D may each use one or more previously tested machine-learned models (e.g., neural network(s) 808B-808D) to generate the outputs (e.g., 810B-810D). The monitoring circuitry 812 can assign a certain weight to the first output data 810A when evaluating an output consistency such that even if the first output data 810A is strongly inconsistent, an overall output consistency can be found to exist, as the first neural network 808A is a recently developed algorithm in comparison to the more tested models 808B-808D. As another example, three functional circuits (e.g., 806A-806C) can generate three outputs (e.g., 810A-810C) using three instances of a neural network (e.g., 808A-808C). Fourth neural network(s) 808D can be a deterministic neural network or a deterministic non-learned algorithm. The fourth functional circuitry 806D can generate fourth output data 810D using fourth neural network(s) 808D. The monitoring circuitry 812 can weigh the consistency of the fourth output 810D more heavily (e.g., due to the deterministic algorithm, etc.) such that inconsistency can be found even if each of the first three outputs 810A-810C are significantly consistent.

The monitoring circuitry 812 can detect that output data is inconsistent across the output data 810A-810D. In response to detecting that output data is inconsistent, the monitoring circuitry 812 can generate data indicative of a detected anomaly associated with the first autonomous function (e.g., output consistency data 814, fault detection data, anomaly detection data, etc.). The detected anomaly can be based on one or more aspects of the detected output inconsistency (e.g., as described by output consistency data 814). As an example, the monitoring circuitry 812 can receive four object trajectories. The first two object trajectories can indicate that an object trajectory does not intersect the autonomous vehicle while the last two object trajectories can indicate that the object trajectory does intersect the vehicle.

The detected anomaly can indicate an anomaly between the results of the functional circuits 806A-806D.

In some implementations, one or more of the functional circuits 806A-806D can be configured to determine an optimal output based on the output consistency data 814. Using the previous example of the four object trajectories, one of the functional circuits 806A-806D may determine that the optimal output should include the object trajectory of the first two outputs that intersects the path of the autonomous vehicle. As another example, the functional circuits 806A-806D may, in response to the inconsistency detected by the monitoring circuit 812, be utilized by a vehicle control signal generator 816 to generate vehicle control signals 818 (e.g., emergency control signals configured to safely stop the autonomous vehicle, slowly bring the autonomous vehicle to a stop, navigate the autonomous vehicle out of the possible path of the intersecting object and stop the autonomous vehicle, etc.).

The autonomous vehicle computing system can generate one or more vehicle control signals 818 using a vehicle control signal generator 816. In some implementations, the vehicle control signal generator 816 can be included in the autonomous vehicle computing system. Alternatively, in some implementations, the vehicle control signal generator 816 can be located externally from the autonomous vehicle computing system (e.g., an adjacent and/or associated computing system such as a vehicle control computing system, vehicle interface computing system, etc.), and can receive the output consistency data 814 from the autonomous vehicle computing system. The vehicle control signals 818 can be based at least in part on the output consistency data 814 and/or an optimal output. In some implementations, the autonomous vehicle computing system can use one or more of the functional circuits (e.g., 806A-806D) to generate the vehicle control signals 818. Additionally, or alternatively, in some implementations the autonomous vehicle computing system can use a processor and/or computing device separate from the functional circuits 806A-806D to generate the vehicle control signals 818 (e.g., a vehicle control system).

The vehicle control signals 818 can be based at least in part on the output consistency data 814. As an example, the first, second, third, and fourth output data (e.g., 810A-810D) can be substantially similar or identical motion plans for the autonomous vehicle. Vehicle control signals 818 can be generated that control the vehicle to operate according to one of the motion plans.

In some implementations, the vehicle control signals 818 can be based at least in part on an optimal output. As an example, the optimal output can be an optimal motion plan as determined by the monitoring circuitry 812 based at least in part on the output consistency data 814. Vehicle control signals 818 can be generated that control the vehicle to operate according to the optimal output.

Figures 9A, 9B:
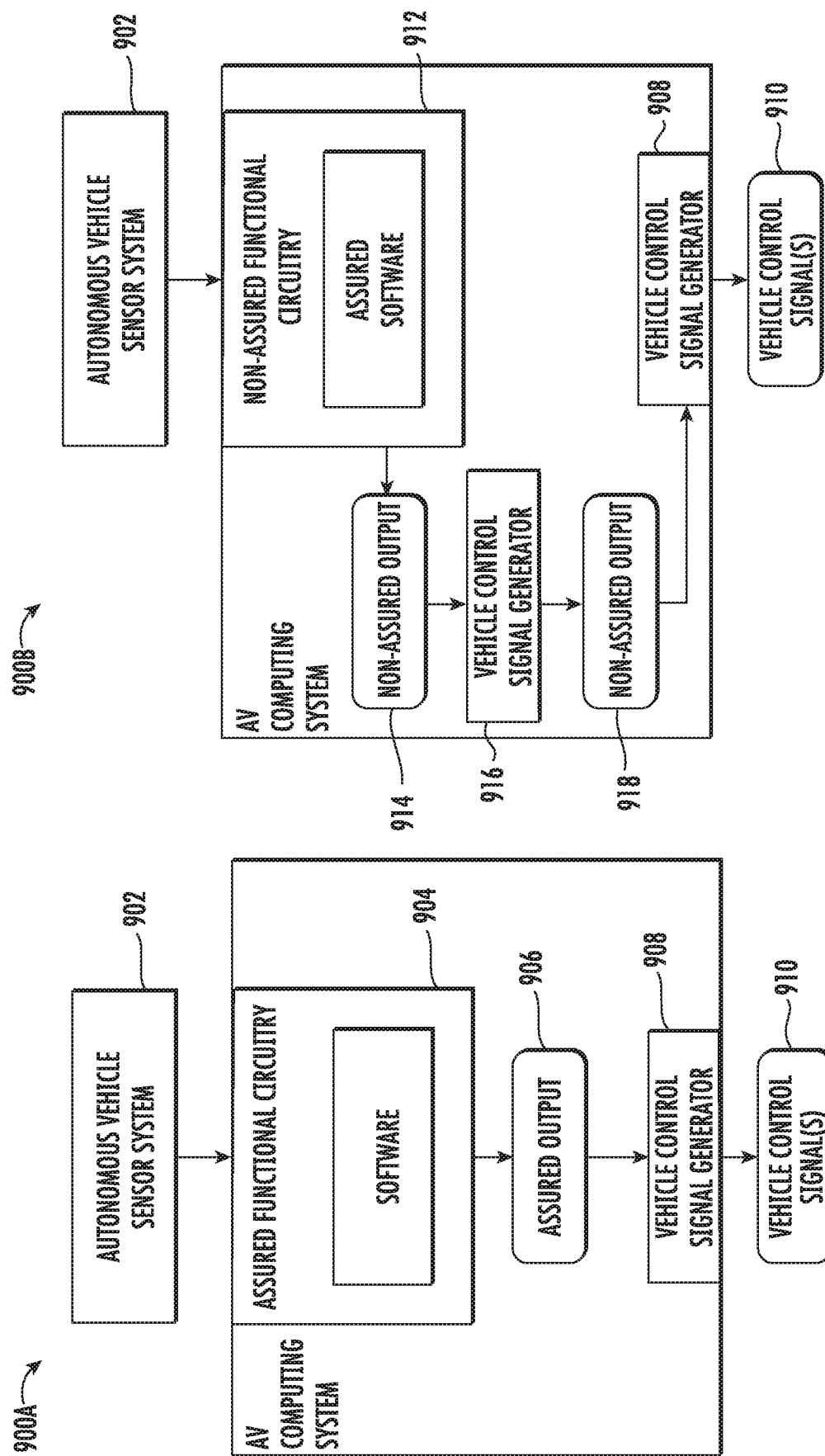
FIG. 9A is a block diagram depicting a process for generating assured outputs for an autonomous vehicle using assured functional circuitry according to example embodiments of the present disclosure.
FIG. 9B is a block diagram depicting a process for generating non-assured outputs and checking the non-assured outputs using an assured checking system according to example embodiments of the present disclosure.

FIG. 9A is a block diagram depicting a process 900A for generating assured outputs for an autonomous vehicle using assured functional circuitry according to example embodiments of the present disclosure. The autonomous vehicle computing system can receive sensor data (e.g., data associated with the autonomous vehicle sensor system) from an autonomous vehicle sensor system 902. It should be noted that although the data depicted is sensor data, the data received by the autonomous vehicle computing system can, in some implementations, be any other sort of data that can be processed to generate an output. As an example, the data obtained by the autonomous vehicle computing system can be or otherwise include a previous output of the autonomous vehicle computing system.

The data associated with the sensor system can be received by the assured functional circuitry 904. Assured functional circuitry 904 can be or otherwise include hardware components (e.g., processor(s), ASIC(s), FPGA(s), etc.) that are certified to a certain functional safety standard (e.g., ASIL-D of ISO26262, etc.). Assured functional circuitry 904 can execute software instructions (e.g., algorithm(s), instructions, operating system(s), etc.) that are also assured to a certain functional safety standard (e.g., ASIL-D of ISO26262, etc.).

As the hardware and software of the assured functional circuitry 904 is assured, an assured output 906 can be generated solely from the assured functional circuitry 904 without the use of monitoring circuitry or an additional functional circuitry. As an example, the assured functional circuitry 904 may include an ASIL-D certified central processing unit, an ASIL-D certified operating system, and one or more ASIL-D certified deterministic algorithms. The assured functional circuitry 904 can generate an ASIL-D assured output 906 for a non-stochastic autonomous function of the autonomous vehicle (e.g., user interface generation, vehicle lighting controls, climate control, etc.). It should be noted that although monitoring circuitry is not required to check the assured output 906 of the assured functional circuitry 904, monitoring circuitry can still be utilized to monitor the proper internal operation of the assured functional circuitry 904 (e.g., CPU voltages, CPU frequency variations, GPU temperatures, etc.).

The assured output can be received by the vehicle control signal generator 908. The vehicle control signal generator can generate vehicle control signals 910. As the assured output 906 is generally directed to a non-stochastic autonomous function of the autonomous vehicle, the vehicle control signals are generally directed to implementing non-stochastic autonomous functions (e.g., trajectory execution, lateral and/or longitudinal control, etc.). However, in some implementations, the vehicle control signals can be based at least in part on both the assured output 906 and a non-assured stochastic output, and therefore can be directed to a stochastic autonomous function of the autonomous vehicle in certain circumstances.

FIG. 9B is a block diagram depicting a process 900B for generating non-assured outputs and checking the non-assured outputs using an assured checking system according to example embodiments of the present disclosure. The autonomous vehicle computing system can receive sensor data (e.g., data associated with the autonomous vehicle sensor system) from an autonomous vehicle sensor system 902. It should be noted that although the data depicted is sensor data, the data received by the autonomous vehicle computing system can, in some implementations, be any other sort of data that can be processed to generate an output. As an example, the data obtained by the autonomous vehicle computing system can be or otherwise include a previous output of the autonomous vehicle computing system.

The data associated with the sensor system can be received by the non-assured functional circuitry 912. Non-assured functional circuitry 912 can be or otherwise include hardware components (e.g., processor(s), ASIC(s), FPGA(s), etc.) that are not certified to a certain functional safety standard (e.g., ASIL-D of ISO26262, etc.). As an example, most consumer-grade and/or commercial-grade central processing units (e.g., AMD Epyc™ processors, Intel Xeon™ processors, etc.) are not assured to the specifications of functional safety standards such as ASIL-D of ISO26262.

However, non-assured functional circuitry 912 can execute software instructions (e.g., algorithm(s), instructions, operating system(s), etc.) that are assured to a certain functional safety standard (e.g., ASIL-D of ISO26262, etc.). In some implementations, the software executed by the non-assured functional circuitry 912 can be certified to generate functional statistical outputs (e.g., certified to the state of the intended function (SOTIF certified), etc.). More particularly, the stochastic algorithms utilized by the non-assured functional circuitry 912 (e.g., machine-learned models, neural network(s), etc.) can be certified as being developed, verified, and validated in manner sufficient to comply with a highest level of certain safety standards (e.g., SOTIF of ISO/PAS 21448, etc.).

The non-assured functional circuitry 912 can generate non-assured output 914. As described previously, the non-assured output 914 can be non-assured from the specifications of a highest functional safety standard (e.g., ASIL-D of ISO26262) but can still be certified as to other safety standards (e.g., SOTIF of ISO/PAS 21448, etc.). The non-assured output 914 can be "checked" by assured monitoring circuitry (e.g., ASIL-D certified, etc.) such as assured checker circuitry 916. More particularly, the output of the non-assured functional circuitry 912 (e.g., functional circuitry that does not produce an assured output, functional circuitry that is not monitored by an assured circuitry, etc.) can be verified by assured checker circuitry 916. In such fashion, the pair of non-assured functional circuitry 912 and assured checker circuitry 916 can operate in a "doer-checker" manner. In some implementations, the functional circuits (e.g., non-assured functional circuitry 912, etc.) can dynamically switch between any of the other previous methods and/or configurations described previously (e.g., "lockstep" configurations, "asynchronous" configurations, etc.) and a "doer-checker" configuration based on one or more aspects of the compute task requested.

More particularly, for some compute tasks (e.g., stochastic output generation using machine-learned models, etc.), a "doer-checker" configuration can require that the computational complexity of the operations of the monitoring circuitry (e.g., the "checking") is equal to that of the operations of the functional circuitry (e.g., the "doing"). As an example, the verification of an object trajectory output by a monitoring circuitry can, in some instances, be extremely computationally complex.

In other instances, the non-assured output 914 of non-assured functional circuitry 912 cannot be properly verified using the ASIL-D hardware of assured checker circuitry 916. In such instances, the processing circuits can utilize one of the previously described configurations (e.g., a "lockstep" configuration, an "asynchronous" configuration, etc.) to assure the functionality of the outputs. As depicted, with only one non-assured functional circuitry 912 and one assured checker circuitry 916, the non-assured output can remain non-assured (e.g., as non-assured output 918.

In other instances, an output of the functional processing circuitry can be more easily validated by monitoring circuitry. As an example, a deterministic output from a functional circuitry (e.g., a trajectory execution, longitudinal and/or lateral control, etc.) can be easily verified by the monitoring circuitry. As another example, some stochastic outputs (e.g., a motion plan, etc.) can, in some circumstances, be properly assured by the monitoring circuitry. In such instances, the processing circuitries may utilize a "doer-checker" configuration.

The non-assured output can be received by the vehicle control signal generator 908. The vehicle control signal generator can generate vehicle control signals 910. As the non-assured output 906 is generally directed to a stochastic autonomous function of the autonomous vehicle, the vehicle control signals are generally directed to implementing or utilizing stochastic autonomous functions (e.g., motion plans, object trajectories, etc.). However, in some implementations, the lack of assurance of the output 918 can mean that the vehicle control signals can instead be directed towards safely stopping the vehicle (e.g., emergency vehicle control signals, etc.).

Figure 10:
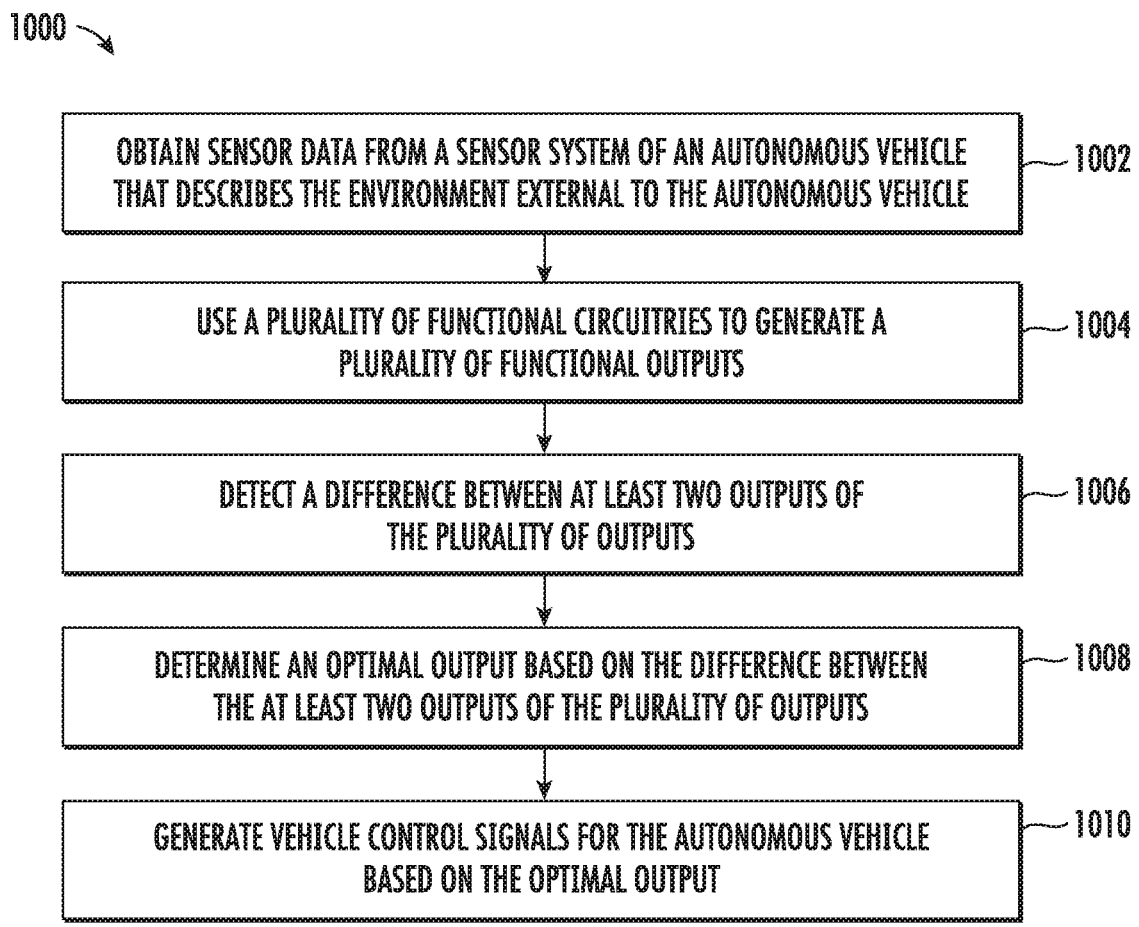
FIG. 10 depicts a flowchart illustrating an example method for generating vehicle control signals based on detected differences between outputs of a plurality of functional circuits according to example embodiments of the present disclosure.

FIG. 10 depicts a flowchart illustrating an example method 1000 for generating vehicle control signals based on detected differences between outputs of a plurality of functional circuits according to example embodiments of the present disclosure. One or more portion(s) of the operations of method 1000 can be implemented by one or more computing systems that include, for example, a vehicle computing system (e.g., vehicle computing system 112, etc.), one or more portions of an operations computing system (e.g., operations computing system 202, etc.). Each respective portion of the method 1000 can be performed by any (or any combination) of the computing device(s) (e.g., functional circuits, monitoring circuits, etc.) of the respective computing system. Moreover, one or more portion(s) of the method 1000 can be implemented as an algorithm on the hardware components of the device(s) described herein, for example, to generate outputs for an autonomous vehicle computing system. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include obtaining sensor data from a sensor system of an autonomous vehicle that describes the environment external to the autonomous vehicle. More particularly, a plurality of functional circuits can be configured to obtain sensor data associated with a sensor system of the autonomous vehicle. The sensor data can describe one or more aspects of an environment external to the autonomous vehicle at a current time. As an example, a first functional circuit can obtain sensor data depicting the environment at a first time, while a second functional circuit can obtain sensor data depicting the environment at a second time. As such, the sensor data can differ based on the time in which the sensor data was obtained.

At 1004, the method 1000 can include using a plurality of functional circuits to generate a plurality of functional outputs. More particularly, each of the functional circuits can be further configured to generate a respective output over a time period (e.g., an amount of time required to process the input and generate an output). The respective output (e.g., a motion plan, perception, prediction, object trajectory, pose, etc.) can be based at least in part on the sensor data. As the time period represents the amount of time required for processing over all of the functional circuitry, the time period can be variable and can vary based on the computational capacity of each functional circuit. As an example, first functional circuitry including four GPUs may generate the output over a smaller portion of the time period than second functional circuitry with a single GPU. Further, even assuming that all functional circuits have identical computational capacity, the sequential and asynchronous input of sensor data to each of the respective functional circuits can lead to a sequential and asynchronous generation of respective outputs. More particularly, the outputs can be generated in the same specified order as the inputs. As the outputs are generated, the outputs can be sent to monitoring circuitry (e.g., through the one or more communication switches, with a direct communication link from the functional circuitry to the monitor circuitry, etc.).

The functional circuits can, in some implementations, work asynchronously and in parallel. As an example, first functional circuitry can obtain sensor data and begin to generate the output over the time period. While the first functional circuitry generates the output, second functional circuitry can obtain sensor data and begin to generate the respective output over the time period. The first functional circuitry can finish generating the output and a third functional circuitry can obtain sensor data while the second functional circuitry is generating the output over the time period. As such, each of the functional circuits can work in parallel on the inputs in the order they are received.

At 1006, the method 1000 can include detecting a difference between at least two outputs of the plurality of outputs. More particularly, monitoring circuitry can be configured to evaluate the outputs according to the specified order in which the outputs are received. The specified order in which the outputs are received can be the same order in which the sensor data is obtained and the outputs are generated. By evaluating the outputs in the specified order, the monitoring circuitry can determine an output consistency of the respective outputs. More particularly, the monitoring circuitry can detect large variations between outputs over time. It should be noted that the sensor data obtained by each functional circuit can be different (e.g., based on the time it was obtained, etc.) and therefore each output should not necessarily be identical. Instead, the output consistency can measure large variations in the outputs to determine if the outputs are sufficiently consistent.

In determining the output consistency, the monitoring circuitry can, in some implementations, assign different weights to the outputs based on the specified order. As an example, the monitoring circuitry can weigh the consistency of later respective outputs over earlier respective outputs. For example, if a monitoring circuit receives five outputs where the first three outputs do not recognize an object in an environment and the last two outputs do recognize an object in the environment, the monitoring circuit can still find a sufficient level of consistency between the results, as the consistency of the last two outputs can be weighed more heavily as they are more temporally relevant than the first three outputs. As such, the temporal recency of the outputs can be considered and utilized in the weighting of consistency between outputs by the monitoring circuit.

The level of output consistency required can, in some implementations, be specified by a consistency threshold (e.g., a discrete value, etc.). As an example, the monitoring circuit may assign a percentage level of consistency to the results, which can fall above or below a predetermined consistency threshold. The consistency threshold can be determined by the autonomy computing system, and can dynamically vary based on one or more aspects of the autonomous vehicle's operation (e.g., previous faults, weather, environment, previously detected objects, etc.). As an example, if faults have already been detected in the computing system's operation, the consistency threshold may be raised to further assure the proper functionality of the autonomy computing system. As another example, if the weather in the environment external to the autonomous vehicle is poor (e.g., raining, fog, etc.), the consistency threshold may be raised to assure proper functionality.

Additionally, or alternatively, in some implementations, the monitoring circuit can weigh the consistency of various outputs based on an algorithm (e.g., deterministic algorithm, neural network, machine-learned model, etc.) used to generate the output. As an example, first functional circuitry may use a recently developed machine-learned model to generate a first output. Second, third, and fourth functional circuits may each use a previously tested machine-learned model to generate the respective outputs. The monitoring circuitry can assign a certain weight to the first output when evaluating an output consistency such that even if the first output is strongly inconsistent, an overall output consistency can be found to exist. As another example, if three functional processing circuitries generated three outputs using three instances of a neural network, and a fourth functional circuitry generated a fourth output using a deterministic algorithm, the monitoring circuitry can weigh the consistency of the fourth output more heavily such that inconsistency can be found even if each of the first three functional circuitries are significantly consistent.

The monitoring circuitry can detect that an output is inconsistent across the respective outputs. In response to detecting that the outputs are inconsistent, the monitoring circuitry can generate data indicative of a detected anomaly associated with the first autonomous function. The detected anomaly can be based on one or more aspects of the detected output inconsistency. As an example, the monitoring circuit can receive four object trajectories. The first two object trajectories can indicate that an object trajectory does not intersect the autonomous vehicle while the last two object trajectories can indicate that the object trajectory does intersect the vehicle. The detected anomaly can indicate an anomaly between the results of the functional circuitries At 1008, the method 1000 can include determining an optimal output based on the difference between the at least two outputs of the plurality of outputs. More particularly, one or more of the functional circuitries can be configured to determine an optimal output based on the output consistency. Using the previous example of the four object trajectories, the one or more functional circuitries may determine that the optimal output should include the object trajectory of the first two outputs that intersects the path of the autonomous vehicle. As another example, the one or more functional circuitries may, in response to the inconsistency detected by the monitoring circuit, generate emergency control signals configured to safely stop the autonomous vehicle (e.g., slowly bring the autonomous vehicle to a stop, navigate the autonomous vehicle out of the possible path of the intersecting object and stop the autonomous vehicle, etc.).

At 1010, the method 1000 can include generating vehicle control signals for the autonomous vehicle based on the optimal output. More particularly, the autonomous vehicle computing system can generate one or more vehicle control signals for the autonomous vehicle based at least in part on the optimal output. In some implementations, the autonomous vehicle computing system can use one or more of the functional circuits to generate the vehicle control signals. Additionally, or alternatively, in some implementations the autonomous vehicle computing system can use a processor and/or computing device separate from the functional circuits to generate the vehicle control signals (e.g., a vehicle control system).

Figure 11:
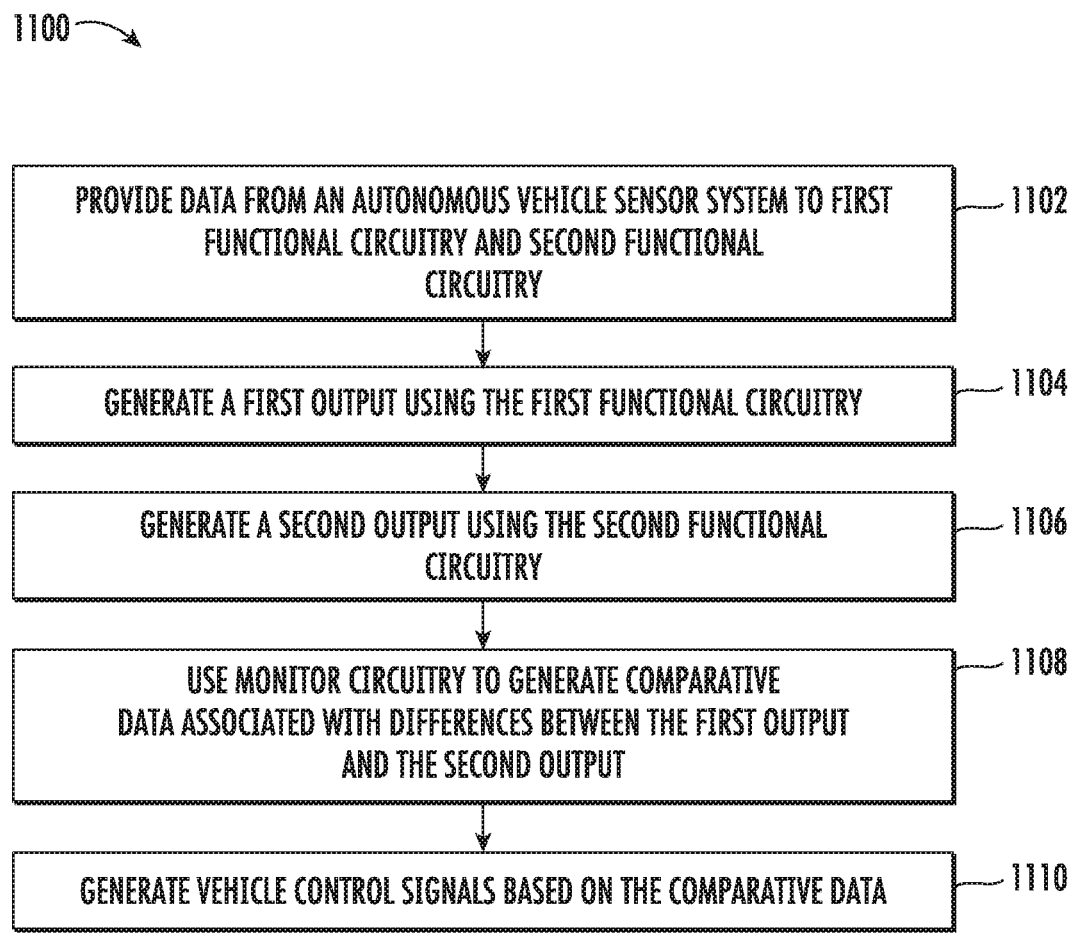
FIG. 11 depicts a flowchart illustrating an example method for generating vehicle control signals based on comparative data describing differences between two outputs from two functional circuits.

FIG. 11 depicts a flowchart illustrating an example method for generating vehicle control signals based on comparative data describing differences between two outputs from two functional circuits. One or more portion(s) of the operations of method 1100 can be implemented by one or more computing systems that include, for example, a vehicle computing system (e.g., vehicle computing system 112, etc.), one or more portions of an operations computing system (e.g., operations computing system 202, etc.). Each respective portion of the method 1100 can be performed by any (or any combination) of the computing device(s) (e.g., functional circuits, monitoring circuits, etc.) of the respective computing system. Moreover, one or more portion(s) of the method 1000 can be implemented as an algorithm on the hardware components of the device(s) described herein, for example, to generate outputs for an autonomous vehicle computing system. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1102, the method 1100 can include providing data from an autonomous vehicle sensor system to first functional circuitry and second functional circuitry. More particularly, data associated with a sensor system of the autonomous vehicle can be provided to first functional circuitry and second functional circuitry of the autonomous vehicle computing system. The first functional circuitry can be configured to generate one or more first outputs (e.g., motion plan(s), object trajectories, etc.).

In some implementations, a functional circuitry can include one or more processors (e.g., central processing unit(s) (CPUs), CPU core(s), graphics processing unit(s) (GPUs), application-specific integrated circuit(s) (ASICs), field-programmable gate array(s), or any other sort of integrated circuit or processing apparatus. As an example, a functional circuit in some examples may include two CPUs, four GPUs, and two FPGAs. As another example, a functional circuitry can include one CPU core and two GPUs. As such, a single multicore CPU can, in some implementations, have a first core of the CPU included in a first functional circuit and a second core included in a second functional circuit. It should be noted that in some implementations, the processor(s) of the functional circuit can be communicatively connected to other processor(s) of the same functional circuit and/or other functional circuits. As an example, a CPU of a first functional circuitry can be communicatively coupled to a CPU of a second functional circuit (e.g., through respective ethernet-connected chipsets, interconnects, shared memory, etc.). This communication link can provide redundant communication channels between functional circuits in the case that a main processor communication channel (e.g., a communication switch, etc.) fails.

In some implementations, a functional circuitry can include one or more memories (e.g., random access memory (RAM), flash memory, solid-state storage device(s) (SSDs), magnetic storage drive, etc.). These one or more memories can be communicatively connected to and/or utilized by one or more other components of the functional circuit. As an example, the functional circuit may include two random access memory devices (e.g., two 16-gigabyte DDR4 RAM devices, etc.) that can be accessed and/or utilized by one or more processors of the functional circuit. As another example, the functional circuitry may include a plurality of solid-state storage devices (e.g., NAND-based flash memory, etc.) that can be accessed and/or utilized by one or more processors of the functional circuitry (e.g., a graphics processing unit, etc.).

In some implementations, a functional circuit can include one or more printed circuit boards (PCBs) configured to house and/or facilitate communication between components of the functional circuit. PCBs can include, for example, communication interfaces (e.g., bridges, I/O ports, ethernet ports, connectors, PCI slots, etc.) to facilitate communication between processors of the functional circuitry. For example, a PCB (e.g., a motherboard, etc.) may include a chipset (e.g., a northbridge, a southbridge, etc.) configured to facilitate communication between CPU(s), GPU(s), memory, and other components of the functional circuit. As another example, PCBs can include communication interfaces (e.g., serial ports, ethernet ports, IDE ports, SATA ports, etc.) that can be used by components of the functional circuit to communicate with other functional circuits and/or with other components of the compute architecture (e.g., monitoring circuitries, microcontroller unit(s), switch(es), etc.). The specific implementation of communication between components of the functional circuit and between components of the broader compute architecture will be discussed with greater detail as described in the figures.

It should be noted that, in some implementations, any and/or all of the component(s) of a functional circuit, and/or the functional circuit itself, can be virtualized (e.g., as a virtual component, virtual machine, container, etc.). As an example, a first processor of a first functional circuit and a second processor of a second processing circuit may both respectively be virtualized processors. As another example, a first memory of a first functional circuit and a second memory of a second functional circuit may both respectively be virtualized memory instances referencing a single physical memory. In such fashion, the autonomous vehicle compute architecture can provide the capability to dynamically generate and/or scale virtualized hardware resources based on the needs of the autonomous vehicle computing system.

At 1104, the method 1100 can include generating a first output using the first functional circuitry.

At 1106, the method 1100 can include generating a second output using the second functional circuitry. More particularly, both the first output(s) and the second output(s) can be associated with the same autonomous function of the vehicle (e.g., motion planning, object recognition, object classification, pose calculation(s), etc.). As an example, both the first output(s) and the second output(s) can be motion plans for the autonomous vehicle. As another example, both the first output(s) and the second output(s) can be identifications of a moving object in an environment external to the autonomous vehicle. The associated autonomous function of the vehicle can, in some implementations, be any sort of processing task and/or operation associated with the autonomous functionality of the vehicle. In such fashion, the functional circuitries can generate outputs in a "lockstep" manner to assure proper output functionality and also provide multiple redundancies in the case of system failures.

In some implementations, separate first functional circuitry and second functional circuitry can utilize the same algorithm(s) to generate the first output(s) and the second output(s). As an example, both the first functional circuitry and the second functional circuitry may respectively utilize machine-learned models (e.g., a neural network, etc.) configured to perform the same function and to generate outputs. Alternatively, in some implementations, the first functional circuitry and the second functional circuitry can use different algorithms to generate the outputs from the sensor data. As an example, the first functional circuitry may utilize a first machine-learned model (e.g., a convolutional neural network, recurrent neural network, etc.) trained on a first set of training data, while the second functional circuitry may utilize a second machine-learned model trained on a second set of training data. In such fashion, the autonomous vehicle computing system can utilize different algorithms to generate and evaluate outputs associated with the same autonomous compute function.

At 1108, the method 1100 can include using monitor processing circuitry to generate comparative data associated with differences between the first output and the second output. More particularly, the one or more monitoring circuits of the autonomous vehicle computing system can be used to determine a difference between the first and second outputs of the functional circuits. More particularly, monitoring circuitry can generate comparative data associated with one or more differences between the first output data and the second output data. As an example, first output data may indicate a first output describing a first trajectory of an object external to the autonomous vehicle while second output data may indicate a second trajectory of the object. If the first trajectory and the second trajectory are within a certain degree of similarity, the comparative data can indicate that the functionality of both outputs is assured.

In some implementations, generating the comparative data can include detecting a fault within functional circuitry of the autonomous vehicle computing system. More particularly, by generating the comparative data, the monitoring circuitry can detect a fault within one or more of the associated functional circuits being compared. A fault can be detected based on a certain degree of difference between outputs and/or an inherent aspect of an output (e.g., an impossible prediction, incompatible output, etc.). As an example, a first output may include a detection of an object external to the autonomous vehicle while a second output may not include a detection of the object in question. By generating the comparative data, the monitoring circuitry can detect a fault within the second functional circuit associated with the failure to recognize the object external to the autonomous vehicle. For instance, a fault can be detected based on a difference between outputs that satisfies a difference threshold.

In some implementations, the comparative data can be generated by validating the outputs of the functional circuits. More particularly, the monitoring circuitry can use first functional circuitry to validate a second output from second functional circuitry to generate a second output validation of the second output. The first functional circuitry can generate the second output validation by validating the second output against a world state associated with the first functional circuitry. The world state can describe a perception of the environment external to the autonomous vehicle. The second functional circuitry generate a first output validation for the first output in the same manner. Thus, in such fashion, the functional circuits can be used to cross-validate outputs to assure proper functionality of the outputs and the functional circuitry At 1110, the method 1100 can include generating vehicle control signals based on the comparative data. More particularly, the autonomous vehicle computing system can generate one or more vehicle control signals for the autonomous vehicle based at least in part on the comparative data and/or one or more motion plans. In some implementations, the autonomous vehicle computing system can use one or more of the functional circuits to generate the vehicle control signals. Additionally, or alternatively, in some implementations the autonomous vehicle computing system can use a processor and/or computing device separate from the functional circuits to generate the vehicle control signals (e.g., a vehicle control system).

The vehicle control signals can be based at least in part on the comparative data associated with the difference(s) between the first output data and the second output data. As an example, both the first and second output data can be substantially similar or identical motion plans for the autonomous vehicle. Vehicle control signals can be generated that control the vehicle to operate according to one of the motion plans. As another example, the first and second output data can be predictions for the trajectory of an object external to the autonomous vehicle. Vehicle control signal(s) can be generated to control the vehicle to avoid the predicted trajectory of the object. In some examples, the autonomy computing system can select an output of one of the functional circuits as an optimal output. In some instances, the optimal output can be the output provided by one of the functional circuits implemented as a default functional circuit. In other examples, an optimal output can be selected based on an evaluation of the outputs. For instance, a probability assessment associated with the outputs can be used to select an output as an optimal output. In yet another example, a combination of the outputs from multiple functional circuits configured for the same autonomous compute function can be used.

In some implementations, emergency control signals can be generated if the comparative data indicates a fault in one or more of the functional circuitries. The emergency control signals can be configured to safely stop the autonomous vehicle (e.g., slow the vehicle, stop the vehicle, navigate the vehicle to a safe stopping location, etc.). As an example, the monitoring circuitry can detect a fault in a second functional circuitry while generating comparative data between first and second outputs. The non-faulting functional circuitry (e.g., the first functional circuitry) can be used to generate the emergency control signals to safely stop the vehicle.

Figure 12:
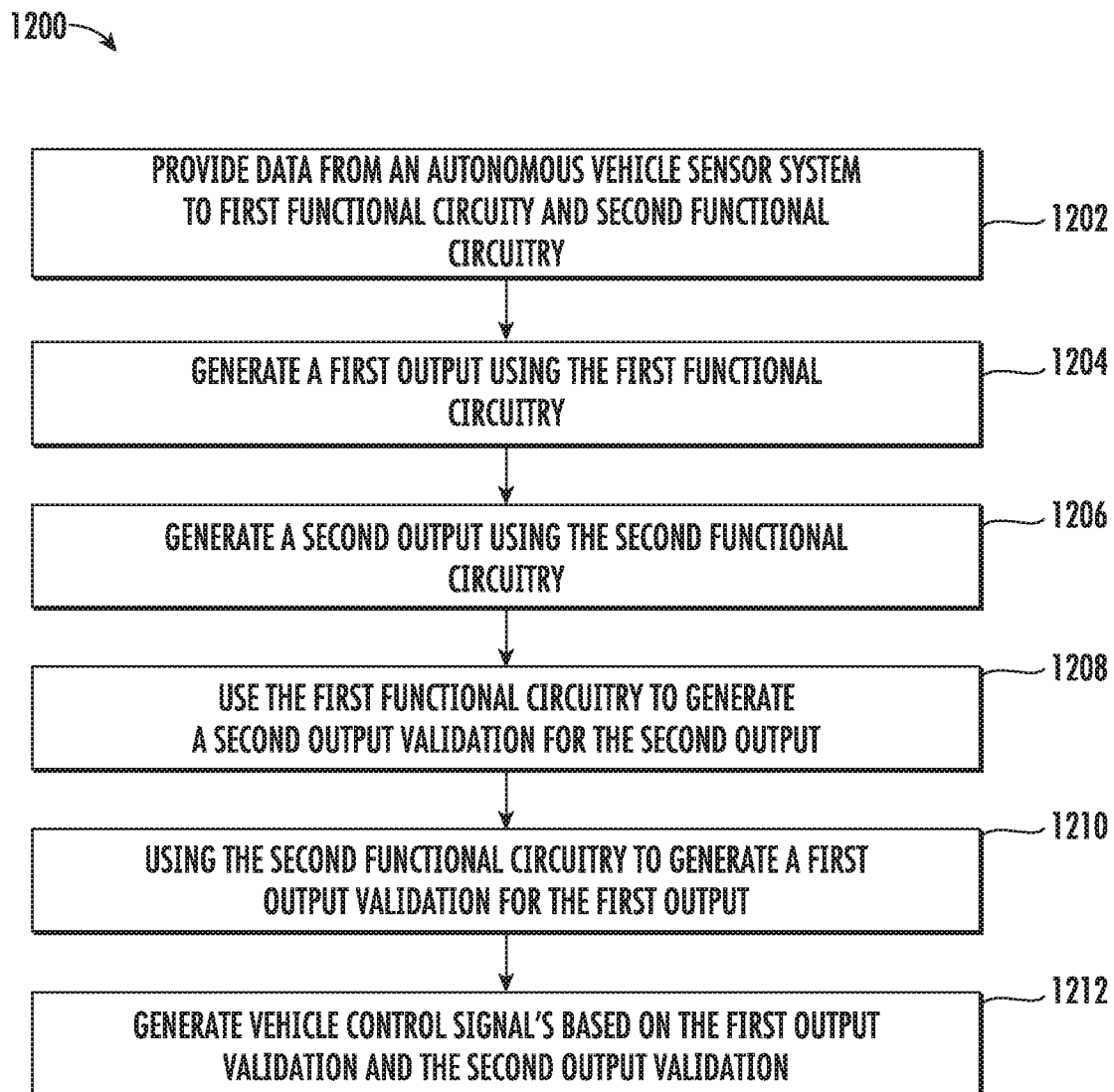
FIG. 12 depicts a flowchart illustrating an example method for generating vehicle control signals based on output validations of outputs from first functional circuitry and second functional circuitry according to example embodiments of the present disclosure.

FIG. 12 depicts a flowchart illustrating an example method for generating vehicle control signals based on output validations of outputs from first functional circuitry and second functional circuitry according to example embodiments of the present disclosure. One or more portion(s) of the operations of method 1200 can be implemented by one or more computing systems that include, for example, a vehicle computing system (e.g., vehicle computing system 112, etc.), one or more portions of an operations computing system (e.g., operations computing system 202, etc.). Each respective portion of the method 1200 can be performed by any (or any combination) of the computing device(s) (e.g., functional circuits, monitoring circuits, etc.) of the respective computing system. Moreover, one or more portion(s) of the method 1200 can be implemented as an algorithm on the hardware components of the device(s) described herein, for example, to generate outputs for an autonomous vehicle computing system. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1202, the method 1200 can include providing data from an autonomous vehicle sensor system to first functional circuitry and second functional circuitry of the autonomous vehicle computing system. The data from the autonomous vehicle sensor system can, in some implementations, describe an environment exterior to the autonomous vehicle. It should be noted that in some implementations, the data can instead be a previous output of a functional circuitry of the autonomous vehicle computing system. In such fashion, the functional circuit(s) can receive a previous output as a current input for processing operations.

At 1204, the method 1200 can include generating a first output using the first functional circuitry.

At 1206, the method 1200 can include generating a second output using the second functional circuitry. More particularly, both the first output(s) and the second output(s) can be associated with the same autonomous function of the vehicle (e.g., motion planning, object recognition, object classification, pose calculation(s), etc.). As an example, both the first output(s) and the second output(s) can be motion plans for the autonomous vehicle. As another example, both the first output(s) and the second output(s) can be identifications of a moving object in an environment external to the autonomous vehicle. The associated autonomous function of the vehicle can, in some implementations, be any sort of processing task and/or operation associated with the autonomous functionality of the vehicle. In such fashion, the functional circuitries can generate outputs in a "lockstep" manner to assure proper output functionality and also provide multiple redundancies in the case of system failures.

In some implementations, separate first functional circuitry and second functional circuitry can utilize the same algorithm(s) to generate the first output(s) and the second output(s). As an example, both the first functional circuitry and the second functional circuitry may respectively utilize machine-learned models (e.g., a neural network, etc.) configured to perform the same function and to generate outputs. Alternatively, in some implementations, the first functional circuitry and the second functional circuitry can use different algorithms to generate the outputs from the sensor data. As an example, the first functional circuitry may utilize a first machine-learned model (e.g., a convolutional neural network, recurrent neural network, etc.) trained on a first set of training data, while the second functional circuitry may utilize a second machine-learned model trained on a second set of training data. In such fashion, the autonomous vehicle computing system can utilize different algorithms to generate and evaluate outputs associated with the same autonomous compute function.

At 1208, the method 1200 can include using the first functional circuitry to generate a second output validation for the second output. The first functional circuitry can be used (e.g., by the autonomous vehicle computing system, by a monitoring circuitry, etc.) to generate the validation of the second output. More particularly, the first functional circuitry can generate the second output validation by validating the second output data against a world state associated with the first functional circuitry. The world state can describe a perception of the environment external to the autonomous vehicle. Further, in some implementations, the world state can be associated with a first neural network(s) instance. The second output validation can be or otherwise include an "evaluation" of the results of the second output. As an example, the second output can describe a trajectory of an object external to the autonomous vehicle. The first functional circuitry can utilize the second output in conjunction with the first neural network instance and the sensor data to confirm that the second output is valid and generate a second output validation/

At 1210, the method 1200 can include using the second functional circuitry to generate a first output validation for the first output. The second functional circuitry can be used (e.g., by the autonomous vehicle computing system, by a monitoring circuitry, etc.) to generate a validation of the first output. More particularly, the second functional circuitry can generate the first output validation by validating the first output data against a world state associated with the first functional circuitry. The world state can describe a perception of the environment external to the autonomous vehicle. Further, in some implementations, the world state can be associated with the second neural network(s) instance. In such fashion, functional circuits and can be used to cross-validate outputs and assure proper functionality of the outputs and the functional circuitry.

In some implementations, comparative data can be generated based on the first output validation and the second output validation (e.g., by monitoring circuitry, by the autonomous vehicle computing system, by the vehicle control signal generator, etc.). Alternatively, or additionally, in some implementations, the vehicle control signal generator can receive the first and second output validations, and based on the validations generate vehicle control signal(s). In some implementations, the vehicle control signal generator can be, include, or otherwise utilize monitoring circuitry to generate the vehicle control signals based on the second output validation and the first output validation. As an example, the vehicle control signal generator can process the first and second output validations with a monitor processing circuitry to generate an optimal output. The optimal output can be an optimal output as described in FIG. 6. The vehicle control signal(s) can be generated by the vehicle control signal generator based at least in part on the optimal output.

At 1212, the method 1200 can include generating vehicle control signals based on the first output validation and the second output validation. More particularly, the vehicle control signals can be based at least in part on the comparative data. As an example, both the first and second output data can be substantially similar or identical motion plans for the autonomous vehicle. Vehicle control signals can be generated that control the vehicle to operate according to one of the motion plans. As another example, the first and second output data can be predictions for the trajectory of an object external to the autonomous vehicle. Vehicle control signal(s) can be generated to control the vehicle to avoid the predicted trajectory of the object.

In some implementations, the vehicle control signals can be emergency control signals generated if the first output validation and/or the second output validation indicates a fault in the first functional circuitry and/or the second functional circuitry. The emergency control signals can be configured to safely stop the autonomous vehicle (e.g., slow the vehicle, stop the vehicle, navigate the vehicle to a safe stopping location, etc.). As an example, the second output validation can indicate a fault in the second functional circuitry. The non-faulting functional circuitry (e.g., the first functional circuitry) can be used to generate the emergency control signals to safely stop the vehicle.

Figure 13:
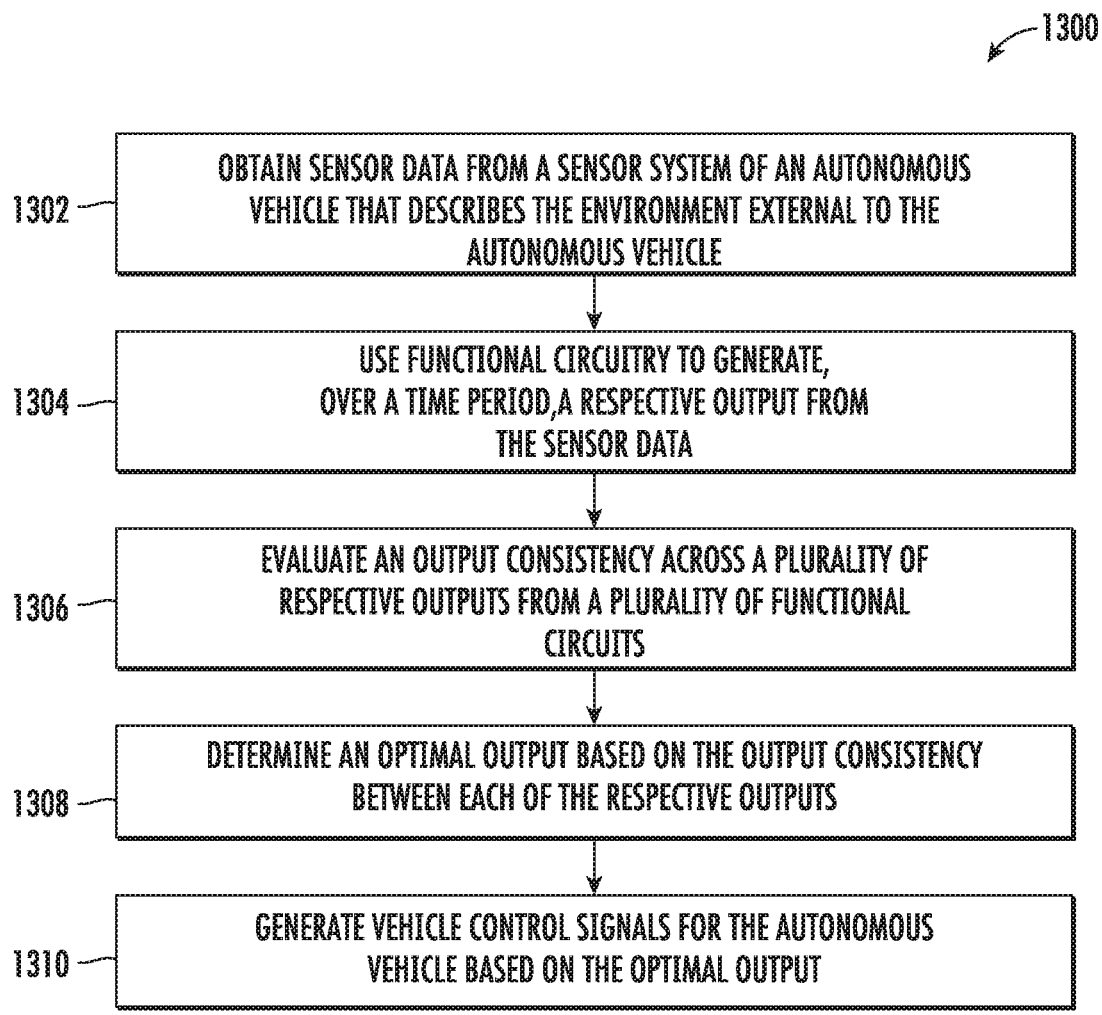
FIG. 13 depicts a flowchart illustrating an example method for generating vehicle control signals from an optimal output based on an output consistency across a plurality of outputs from a plurality of functional circuits according to example embodiments of the present disclosure.

FIG. 13 depicts a flowchart illustrating an example method for generating vehicle control signals from an optimal output based on an output consistency across a plurality of outputs from a plurality of functional circuits according to example embodiments of the present disclosure. One or more portion(s) of the operations of method 1300 can be implemented by one or more computing systems that include, for example, a vehicle computing system (e.g., vehicle computing system 112, etc.), one or more portions of an operations computing system (e.g., operations computing system 202, etc.). Each respective portion of the method 1300 can be performed by any (or any combination) of the computing device(s) (e.g., functional circuits, monitoring circuits, etc.) of the respective computing system. Moreover, one or more portion(s) of the method 1300 can be implemented as an algorithm on the hardware components of the device(s) described herein, for example, to generate outputs for an autonomous vehicle computing system. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1302, the method 1300 can include obtaining sensor data from a sensor system of an autonomous vehicle that describes the environment external to the autonomous vehicle. More particularly, a plurality of functional circuits can be configured to obtain sensor data associated with a sensor system of the autonomous vehicle. The sensor data can describe one or more aspects of an environment external to the autonomous vehicle at a current time. As an example, a first functional circuit can obtain sensor data depicting the environment at a first time, while a second functional circuit can obtain sensor data depicting the environment at a second time. As such, the sensor data can differ based on the time in which the sensor data was obtained.

At 1304, the method 1300 can include using functional circuits to generate, over a time period, a respective output from the sensor data. More particularly, each of the functional circuits can be further configured to generate a respective output over a time period (e.g., an amount of time required to process the input and generate an output). The respective output (e.g., a motion plan, perception, prediction, object trajectory, pose, etc.) can be based at least in part on the sensor data. As the time period represents the amount of time required for processing over all of the functional circuitry, the time period can be variable and can vary based on the computational capacity of each functional circuit. As an example, first functional circuitry including four GPUs may generate the output over a smaller portion of the time period than second functional circuitry with a single GPU. Further, even assuming that all functional circuits have identical computational capacity, the sequential and asynchronous input of sensor data to each of the respective functional circuits can lead to a sequential and asynchronous generation of respective outputs. More particularly, the outputs can be generated in the same specified order as the inputs. As the outputs are generated, the outputs can be sent to monitoring circuitry (e.g., through the one or more communication switches, with a direct communication link from the functional circuitry to the monitor circuitry, etc.).

The functional circuits can, in some implementations, work asynchronously and in parallel. As an example, first functional circuitry can obtain sensor data and begin to generate the output over the time period. While the first functional circuitry generates the output, second functional circuitry can obtain sensor data and begin to generate the respective output over the time period. The first functional circuitry can finish generating the output and a third functional circuitry can obtain sensor data while the second functional circuitry is generating the output over the time period. As such, each of the functional circuits can work in parallel on the inputs in the order they are received.

At 1306, the method 1300 can include evaluating an output consistency across a plurality of respective outputs from a plurality of functional circuits. More particularly, the monitoring circuitry can be configured to evaluate the outputs according to the specified order in which the outputs are received. The specified order in which the outputs are received can be the same order in which the sensor data is obtained and the outputs are generated. By evaluating the outputs in the specified order, the monitoring circuitry can determine an output consistency of the respective outputs. More particularly, the monitoring circuitry can detect large variations between outputs over time. It should be noted that the sensor data obtained by each functional circuit can be different (e.g., based on the time it was obtained, etc.) and therefore each output should not necessarily be identical. Instead, the output consistency can measure large variations in the outputs to determine if the outputs are sufficiently consistent.

In determining the output consistency, the monitoring circuitry can, in some implementations, assign different weights to the outputs based on the specified order. As an example, the monitoring circuitry can weigh the consistency of later respective outputs over earlier respective outputs. For example, if a monitoring circuit receives five outputs where the first three outputs do not recognize an object in an environment and the last two outputs do recognize an object in the environment, the monitoring circuit can still find a sufficient level of consistency between the results, as the consistency of the last two outputs can be weighed more heavily as they are more temporally relevant than the first three outputs. As such, the temporal recency of the outputs can be considered and utilized in the weighting of consistency between outputs by the monitoring circuit.

The level of output consistency required can, in some implementations, be specified by a consistency threshold (e.g., a discrete value, etc.). As an example, the monitoring circuit may assign a percentage level of consistency to the results, which can fall above or below a predetermined consistency threshold. The consistency threshold can be determined by the autonomy computing system, and can dynamically vary based on one or more aspects of the autonomous vehicle's operation (e.g., previous faults, weather, environment, previously detected objects, etc.). As an example, if faults have already been detected in the computing system's operation, the consistency threshold may be raised to further assure the proper functionality of the autonomy computing system. As another example, if the weather in the environment external to the autonomous vehicle is poor (e.g., raining, fog, etc.), the consistency threshold may be raised to assure proper functionality.

Additionally, or alternatively, in some implementations, the monitoring circuit can weigh the consistency of various outputs based on an algorithm (e.g., deterministic algorithm, neural network, machine-learned model, etc.) used to generate the output. As an example, first functional circuitry may use a recently developed machine-learned model to generate a first output. Second, third, and fourth functional circuits may each use a previously tested machine-learned model to generate the respective outputs. The monitoring circuitry can assign a certain weight to the first output when evaluating an output consistency such that even if the first output is strongly inconsistent, an overall output consistency can be found to exist. As another example, if three functional processing circuitries generated three outputs using three instances of a neural network, and a fourth functional circuitry generated a fourth output using a deterministic algorithm, the monitoring circuitry can weigh the consistency of the fourth output more heavily such that inconsistency can be found even if each of the first three functional circuitries are significantly consistent.

The monitoring circuitry can detect that an output is inconsistent across the respective outputs. In response to detecting that the outputs are inconsistent, the monitoring circuitry can generate data indicative of a detected anomaly associated with the first autonomous function. The detected anomaly can be based on one or more aspects of the detected output inconsistency. As an example, the monitoring circuit can receive four object trajectories. The first two object trajectories can indicate that an object trajectory does not intersect the autonomous vehicle while the last two object trajectories can indicate that the object trajectory does intersect the vehicle. The detected anomaly can indicate an anomaly between the results of the functional circuitries.

At 1308, the method 1300 can include determining an optimal output based on the output consistency between each of the respective outputs. More particularly, one or more of the functional circuitries can be configured to determine an optimal output based on the output consistency. Using the previous example of the four object trajectories, the one or more functional circuitries may determine that the optimal output should include the object trajectory of the first two outputs that intersects the path of the autonomous vehicle. As another example, the one or more functional circuitries may, in response to the inconsistency detected by the monitoring circuit, generate emergency control signals configured to safely stop the autonomous vehicle (e.g., slowly bring the autonomous vehicle to a stop, navigate the autonomous vehicle out of the possible path of the intersecting object and stop the autonomous vehicle, etc.).

At 1310, the method 1300 can include generating vehicle control signals for the autonomous vehicle based on the optimal output. As an example, vehicle control signals can be generated that control the vehicle to operate according to or otherwise including the optimal output.

Figure 14:
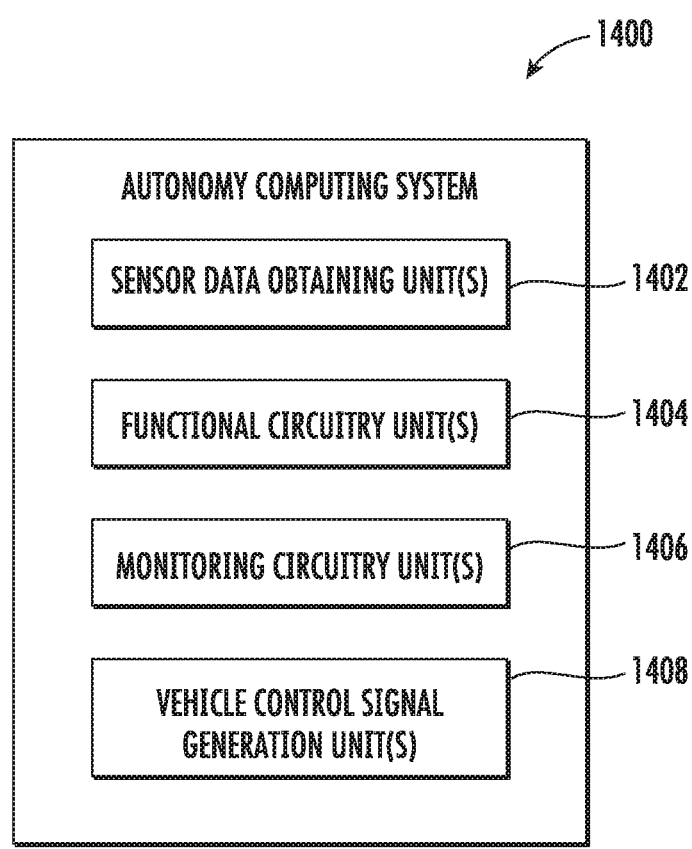
FIG. 14 depicts example system units for performing operations and functions according to example embodiments of the present disclosure.

Various means can be configured to perform the methods and processes described herein. For example, FIG. 14 depicts an example system 1400 that includes various means according to example embodiments of the present disclosure. The computing system 1400 can be and/or otherwise include, for example, the autonomous vehicle computing system. The computing system 1400 can include sensor data obtaining unit(s) 1402, functional circuitry unit(s) 1404, monitoring circuitry unit(s) 1406, vehicle control signal generation unit(s) 1408, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the sensor data obtaining unit(s) 1402) can be configured to obtain data (e.g., sensor data) from an autonomous vehicle that describes an environment external to the autonomous vehicle. The sensor data obtaining unit(s) 1402 is an example of means obtaining such data from an autonomous vehicle at an autonomous vehicle computing system as described herein.

The means (e.g., the functional circuitry unit(s) 1404) can be configured to generate outputs for the autonomous vehicle. For example, the means (e.g., the functional circuitry unit(s) 1404) can be configured to use functional circuitry to generate motion plan(s) for the autonomous vehicle. In some examples, the means can be configured to generate one or more first outputs associated with a first autonomous compute function of the autonomy computing system. In some examples, the means can be configured to generate one or more second outputs associated with the first autonomous compute function of the autonomy computing system. The means can be configured to generate, based on the data associated with the sensor system, one or more first outputs using one or more first neural networks associated with an autonomous compute function of the autonomous vehicle. The means can be configured to generate, using the one or more first neural networks associated with the autonomous compute function, a second output validation for one or more second outputs of second functional circuitry of the autonomous vehicle. The means can be configured to generate, based on the data associated with the sensor system, one or more second outputs using the one or more second neural networks, and generate, using the second one or more neural networks, a first output validation for the one or more first outputs of the first functional circuitry. In some examples, the means can be associated with a first autonomous compute function of the autonomous vehicle and can be configured to, according to a specified order, obtain sensor data associated with a sensor system of the autonomous vehicle and generate, over a time period and based at least in part on the sensor data, a respective output according to the specified order. A functional circuitry unit 1404 is one example of a means for generating functional outputs for the autonomous vehicle computing system as described herein.

The means (e.g., the monitoring circuitry unit(s) 1406) can be configured to utilize monitoring circuitry to monitor the outputs of the functional circuitry of the autonomous vehicle. For example, monitoring circuitry (e.g., the monitoring circuitry unit(s) 1406) can be configured to determine a consistency between a first output of a first functional circuitry and a second output of a second functional circuitry. The consistency can quantize the difference between the outputs of the respective functional circuits. The means can be configured to generate comparative data associated with one or more differences between the first output data associated with the first autonomous function of the autonomy computing system and the second output data associated with the first autonomous function of the autonomy computing system. The means can be configured to evaluate, according to the specified order, an output consistency of the respective outputs, and in response to detecting an output inconsistency between two or more of the respective outputs, generate data indicative of a detected anomaly associated with the first autonomous compute function. A monitoring circuitry unit 1406 is one example of a means for monitoring the outputs and/or operation(s) of functional circuit(s).

The means (e.g., the vehicle control signal generation unit(s) 1408) can be configured to generate motion plan(s) based on the outputs of the monitoring circuitry units. For example, the motion plan generator (e.g., the vehicle control signal generation unit(s) 1408) can be configured to generate one or more motion plan(s) based on a difference between a first output of a first functional circuitry and a second output of a second functional circuitry. The motion plan can be based on a difference threshold between the two functional circuits. A motion plan generation unit 1408 is one example of a means for generating motion plan(s) for an autonomous vehicle based on the difference between output(s).

These described functions of the means are provided as examples and are not meant to be limiting. The means can be configured for performing any of the operations and functions described herein.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomy computing system for an autonomous vehicle, comprising:
    a plurality of functional circuits associated with a first autonomous compute function of the autonomous vehicle, each of the plurality of functional circuits comprising at least one processor that is configured to, according to a specified order:
        obtain sensor data associated with a sensor system of the autonomous vehicle, the sensor data describing one or more aspects of an environment external to the autonomous vehicle at a current time; and
        generate, independent of others of the plurality of functional circuits, over a time period and based at least in part on the sensor data, a respective output associated with the first autonomous compute function according to the specified order, the respective output comprising a stochastic output;
    one or more monitoring circuits configured to:
        evaluate, according to the specified order, an output consistency of the respective outputs; and
        in response to detecting an output inconsistency between two or more of the respective outputs, generate data indicative of a detected anomaly associated with the first autonomous compute function, wherein the data indicative of the detected anomaly comprises an assured output that is assured to a specified functional safety standard; and
    a vehicle control signal generator configured to generate one or more vehicle control signals for controlling the autonomous vehicle based at least in part on the respective outputs.

2. The autonomy computing system of claim 1, wherein each of the plurality of functional circuits is configured to use a respective one of a plurality of neural networks associated with the first autonomous compute function to generate, over the time period and based at least in part on the sensor data, the respective output.

3. The autonomy computing system of claim 1, wherein the specified order specifies an order for each of the plurality of functional circuits and a time delay between each of the plurality of functional circuits, the time delay being less than the time period.

4. The autonomy computing system of claim 1, wherein at least one of the functional circuits of the plurality of functional circuits is configured to determine, based on the output consistency between each of the respective outputs, an optimal output.

5. The autonomy computing system of claim 4, wherein:
    the autonomy computing system is part of a vehicle computing system configured to generate the one or more vehicle control signals for the autonomous vehicle based at least in part on the optimal output.

6. The autonomy computing system of claim 5, wherein the autonomy computing system is configured to determine whether the output consistency between each of the respective outputs satisfies a consistency threshold, and in response to the output consistency failing to satisfy the consistency threshold, generate the one or more vehicle control signals to safely stop the autonomous vehicle.

7. The autonomy computing system of claim 4, wherein the plurality of functional circuits comprises:
    first functional circuitry; and
    second functional circuitry configured to obtain the sensor data during at least a portion of the time period during which the first functional circuitry generates the respective output.

8. The autonomy computing system of claim 7, further comprising:
    third functional circuitry configured to obtain the sensor data during at least a portion of the time period during which the second functional circuitry generates the respective output;
    wherein the sensor data obtained by the third functional circuitry describes one or more aspects of the environment external to the autonomous vehicle at a time different than the sensor data obtained by the second functional circuitry.

9. The autonomy computing system of claim 1, wherein each of the functional circuits comprises at least one of:
    one or more processor cores; or
    one or more computing devices.

10. The autonomy computing system of claim 1, wherein the one or more monitoring circuits comprises virtualized processing circuitry.

11. The autonomy computing system of claim 1, wherein:
    each of the functional circuits includes one or more non-assured hardware processing circuits; and
    the one or more monitoring circuits includes one or more assured processing circuits.

12. The autonomy computing system of claim 1, wherein:
    each of the respective outputs comprises a trajectory and a world state, the world state describing the environment external to the autonomous vehicle; and
    the autonomy computing system is configured to generate motion planning data including the trajectory based at least in part on the environment as described by the world state.

13. The autonomy computing system of claim 1, wherein each of the respective outputs comprises a respective motion plan for the autonomous vehicle.

14. The autonomy computing system of claim 1, wherein each of the respective outputs comprises a trajectory associated with a first object.

15. A computer-implemented method for verifying autonomous vehicle compute processing, comprising:
    obtaining, by a plurality of functional circuits of an autonomy computing system each comprising at least one processor, sensor data associated with a sensor system of the autonomous vehicle, the sensor data describing one or more aspects of an environment external to the autonomous vehicle at a current time, each of the plurality of functional circuits respectively independently associated with a first autonomous compute function of the autonomy computing system;

generating, by each of the plurality of functional circuits and according to a specified order, a plurality of stochastic outputs, each of the plurality of stochastic outputs generated over a time period independently by each of the plurality of functional circuits;

evaluating, by one or more monitoring circuits of the autonomy computing system and according to the specified order, an output consistency of the plurality of stochastic outputs; and in response to detecting an output inconsistency between two or more of the respective outputs, generating, by the autonomy computing system, data indicative of a detected anomaly associated with the first autonomous compute function, wherein the data indicative of the detected anomaly comprises an assured output that is assured to a specified functional safety standard.

16. The computer-implemented method of claim 15, wherein each of the plurality of functional circuits is configured to use a respective one of a plurality of neural networks associated with the first autonomous compute function to generate, over the time period and based at least in part on the sensor data, the plurality of stochastic outputs.

17. The computer-implemented method of claim 15, wherein the specified order specifies an order for each of the plurality of functional circuits and a time delay between each of the plurality of functional circuits, the time delay being less than the time period.

18. An autonomous vehicle, comprising:
a sensor system configured to generate sensor data associated with an environment external to the autonomous vehicle;
an autonomy computing system comprising:
a plurality of functional circuits associated with a first autonomous compute function of the autonomous vehicle, each of the plurality of functional circuits comprising at least one processor that is configured to, according to a specified order:
obtain sensor data associated with the sensor system of the autonomous vehicle, the sensor data describing one or more aspects of an environment external to the autonomous vehicle at a current time; and
generate, independent of others of the plurality of functional circuits, over a time period and based at least in part on the sensor data, a respective output associated with the first autonomous compute function according to the specified order, the respective output comprising a stochastic output;
one or more monitoring circuits configured to:
evaluate, according to the specified order, an output consistency of the respective outputs; and
in response to detecting an output inconsistency between two or more of the respective outputs, generate data indicative of a detected anomaly associated with the first autonomous compute function, wherein the data indicative of the detected anomaly comprises an assured output that is assured to a specified functional safety standard; and
a vehicle control signal generator configured to generate one or more vehicle control signals for controlling the autonomous vehicle based at least in part on the respective outputs.

19. The autonomous vehicle of claim 18, wherein each of the plurality of functional circuits is configured to use a respective one of a plurality of neural networks associated with the first autonomous compute function to generate, over the time period and based at least in part on the sensor data, the respective output.

20. The autonomous vehicle of claim 18, wherein the specified order specifies an order for each of the plurality of functional circuits and a time delay between each of the plurality of functional circuits, the time delay being less than the time period.

* * * * *